United States Patent
Sun et al.

(10) Patent No.: US 11,032,812 B2
(45) Date of Patent: Jun. 8, 2021

(54) STARTING OFFSET FOR NEW RADIO-UNLICENSED (NR-U) UPLINK TRANSMISSION

(71) Applicant: QUALCOMM INCORPORATED, San Diego, CA (US)

(72) Inventors: Jing Sun, San Diego, CA (US); Xiaoxia Zhang, San Diego, CA (US); Kapil Bhattad, Bangalore (IN); Ananta Narayanan Thyagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/804,971

(22) Filed: Feb. 28, 2020

(65) Prior Publication Data
US 2020/0313946 A1    Oct. 1, 2020

(30) Foreign Application Priority Data
Mar. 26, 2019    (IN) .............................. 201941011710

(51) Int. Cl.
*H04W 72/04*    (2009.01)
*H04L 27/26*    (2006.01)
(Continued)

(52) U.S. Cl.
CPC ....... *H04W 72/042* (2013.01); *H04L 27/0006* (2013.01); *H04L 27/2607* (2013.01);
(Continued)

(58) Field of Classification Search
CPC ......... H04W 74/0808; H04W 56/0045; H04W 72/042; H04W 16/14; H04L 27/2607; H04L 27/0006; H04L 27/2646
See application file for complete search history.

(56) References Cited

U.S. PATENT DOCUMENTS

2017/0325115 A1*  11/2017  Matsumoto ........... H04W 24/08
2019/0082474 A1    3/2019  Jung et al.
(Continued)

FOREIGN PATENT DOCUMENTS

WO    2020027533 A1    2/2020

OTHER PUBLICATIONS

International Search Report and Written Opinion—PCT/US2020/020613—ISA/EPO—dated Jun. 12, 2020.
(Continued)

*Primary Examiner* — Min Jung
(74) *Attorney, Agent, or Firm* — Liem T. Do

(57) ABSTRACT

Wireless communications systems and methods related to signaling transmission starting offsets for uplink transmissions in a frequency spectrum shared by multiple network operating entities are provided. A first wireless communication device communicates, with a second wireless communication device, a cyclic prefix (CP) extension length configuration for providing a gap duration for a listen-before-talk (LBT) associated with a first communication signal. The first wireless communication device communicates, with the second wireless communication device, the first communication signal including a CP extension having a length based on the CP extension length configuration.

26 Claims, 12 Drawing Sheets

(51) Int. Cl.
  *H04W 56/00* (2009.01)
  *H04W 74/08* (2009.01)
  *H04L 27/00* (2006.01)

(52) U.S. Cl.
  CPC ..... *H04L 27/2646* (2013.01); *H04W 56/0045* (2013.01); *H04W 74/0808* (2013.01)

(56) References Cited

U.S. PATENT DOCUMENTS

| | | | |
|---|---|---|---|
| 2019/0132882 A1* | 5/2019 | Li | H04W 74/0833 |
| 2019/0159256 A1* | 5/2019 | Talarico | H04L 1/187 |
| 2019/0191457 A1* | 6/2019 | Si | H04W 74/0808 |
| 2019/0253200 A1* | 8/2019 | Salem | H04W 72/042 |
| 2019/0357252 A1* | 11/2019 | Sun | H04W 72/1289 |
| 2020/0037354 A1* | 1/2020 | Li | H04L 5/1469 |
| 2020/0100286 A1* | 3/2020 | Xu | H04L 1/1887 |
| 2020/0107322 A1* | 4/2020 | Lunttila | H04W 72/042 |
| 2020/0112994 A1* | 4/2020 | Zhang | H04L 27/2605 |
| 2020/0145858 A1* | 5/2020 | Matsumoto | H04W 36/0058 |
| 2020/0146058 A1* | 5/2020 | Xu | H04B 7/0639 |
| 2020/0205195 A1* | 6/2020 | Sun | H04W 74/0808 |
| 2020/0235980 A1* | 7/2020 | Wilson et al. | H04L 27/2688 |
| 2020/0275430 A1* | 8/2020 | Salem | H04L 5/0055 |

OTHER PUBLICATIONS

Nokia, et al., "Channel Access and Co-existence for NR-U Operation", 3GPP Draft, 3GPP TSG RAN WG1 Meeting #AH-1901, R1-1900261, Channel Access, 3rd Generation Partnership Project (3GPP), Mobile Competence Centre, 650, Route Des Lucioles, F-06921, Sophia-Antipolis Cedex, France, vol. RAN WG1, No. Taipei, Taiwan; Jan. 21, 2019-Jan. 25, 2019, Jan. 20, 2019 (Jan. 20, 2019), XP051593175, 10 pages, Retrieved from the Internet: URL: http://www.3gpp.org/ftp/Meetings%5F3GPP%5FSYNC/RAN1/Docs/R1%2D1900261%2Ezip [retrieved on Jan. 20, 2019].

Vivo: "Discussion on The Channel Access Procedures", 3GPP Draft, 3GPP TSG RAN WG1#96, R1-1901675, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 15, 2019 (Feb. 15, 2019), XP051599371, 9 pages, Retrieved from the Internet: URL:http://www.3gpp.org/ftp/tsg%5Fran/WG1%5FRL1/TSGR1%5F96/Docs/R1%2D1901675%2Ezip [retrieved on Feb. 15, 2019] Section 2.4; figure 7.

* cited by examiner

STARTING OFFSET FOR NEW RADIO-UNLICENSED (NR-U) UPLINK TRANSMISSION

CROSS REFERENCE TO RELATED APPLICATIONS

The present application claims priority to and the benefit of Indian Provisional Patent Application No. 201941011710, filed Mar. 26, 2019, which is hereby incorporated by reference in its entirety as if fully set forth below and for all applicable purposes.

TECHNICAL FIELD

This application relates to wireless communication systems, and more particularly to signaling transmission starting offsets for uplink transmissions in a frequency spectrum shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology. For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. In NR-U, a transmitting node (e.g., a BS or a UE) may perform a category 1 (CAT1) LBT (e.g., no LBT measurement), a category 2 (CAT2) LBT, or a category 4 (CAT4) LBT prior to transmitting a communication signal in a shared channel. In some wireless communication networks, a transmitting node may determine whether to perform a CAT1 LBT, a CAT2 LBT, or a CAT4 LBT based on a transmission gap prior to the transmission.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, a cyclic prefix (CP) extension length configuration for providing a gap duration for a listen-before-talk (LBT) associated with a first communication signal; and communicating, by the first wireless communication device with the second wireless communication device, the first communication signal including a CP extension having a length based on the CP extension length configuration.

In an additional aspect of the disclosure, an apparatus includes a transceiver configured to communicate, with a first wireless communication device, a cyclic prefix (CP) extension length configuration for providing a gap duration for a listen-before-talk (LBT) associated with a first communication signal; and communicate, with the first wireless communication device, the first communication signal including a CP extension having a length based on the CP extension length configuration.

In an additional aspect of the disclosure, a non-transitory computer-readable medium having program code recorded thereon, the program code includes code for causing a first wireless communication device to communicate, with a second wireless communication device, a cyclic prefix (CP) extension length configuration for providing a gap duration for a listen-before-talk (LBT) associated with a first communication signal; and code for causing the first wireless communication device to communicate, with the second wireless communication device, the first communication signal including a CP extension having a length based on the CP extension length configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
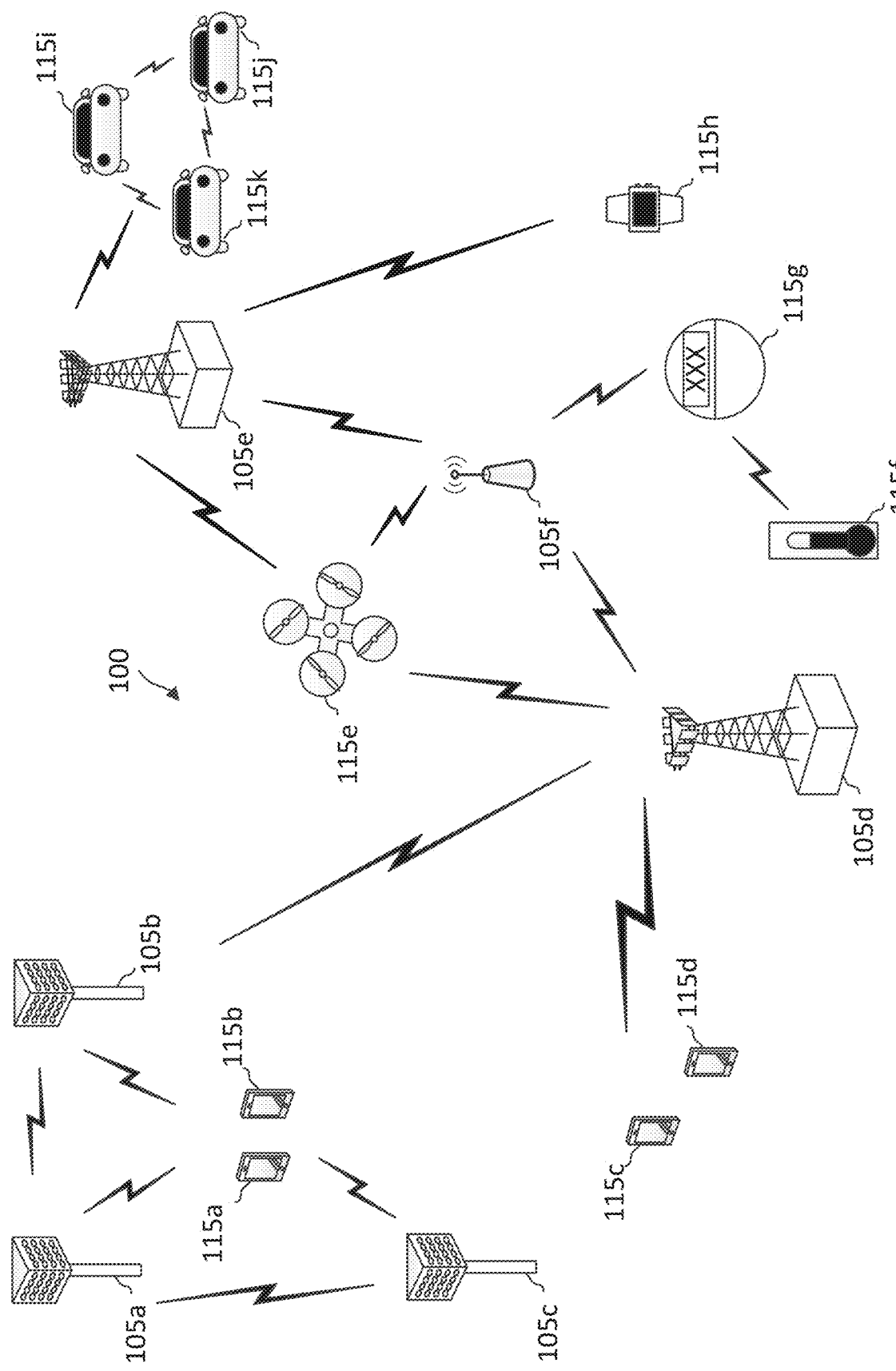
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network operating over a shared channel (e.g., a shared spectrum or an unlicensed spectrum), a BS may create a transmission gap of a specific duration to allow a transmitting node (e.g., a UE or a BS) to perform a certain type of LBT prior to transmitting in the shared channel. The transmission gap may be a downlink-to-uplink (DL-to-UL) gap, an uplink-to-uplink (UL-to-UL) gap, or an uplink-to-downlink (UL-to-DL) gap. A transmitting node may not perform an LBT prior to the transmission when the transmission gap is sufficiently short (e.g., less than about 16 microseconds (μs)). When the transmission gap is long (e.g., longer about 16 μs), another node can potentially gain access to the channel and start a transmission. Thus, the transmitting node may perform a CAT2 LBT prior to a transmission when the transmission gap is long. When the CAT2 LBT passes, the transmitting node may transmit in the shared channel. Otherwise, the transmitting node may refrain from transmitting in the shared channel.

A transmission gap may be created between a first transmission and a second transmission by applying various mechanisms. For example, the first transmission before the gap can end at an earlier time to provide the gap. Alternatively or additionally, the second transmission after the gap can start at a later time to provide the gap. In some examples, transmissions are aligned to symbol boundary. Thus, the first transmission can end at an earlier time by puncturing one or more symbols at the end of the transmission. The second transmission can start at a later time by puncturing one or more symbols at the beginning symbol of the transmission. In order to provide a gap with a certain duration for a certain type of LBT, the second transmission can puncture one or more symbols at the beginning and then prepend the first symbol without puncturing with a cyclic prefix (CP) extension to fill a portion of the punctured symbols so that the gap may have a desired duration.

While the use of puncturing and CP extension can create a certain gap duration, puncturing can degrade performance. For example, for a transmission, such as a physical uplink shared channel (PUSCH) type A transmission in NR, where the beginning symbol carries information bits, puncturing can cause reception performance degradation. The reception performance degradation may not be too significant when time-first rate matching is used, where modulated bits are mapped to tones in a time first frequency second manner. However, for frequency-first rate matching, where modulated bits are mapped to tones in a frequency first time second manner, puncturing can cause a significant reception performance degradation. For example, when frequency-first rate matching mapping is used, for example, as in NR, puncturing may lead to a large coding gain loss or having an entire code block at the beginning of the transmission to be dropped. In another example, for a transmission, such as a PUSCH type B transmission, where the beginning symbol of the transmission carries a reference signal (e.g., a demodulation reference signal (DMRS)) for channel estimation, puncturing can degrade channel estimation performance. Since NR-U has a relatively short symbol duration and applies frequency-first rate matching, the use of puncturing with CP extension for gap creation may not be suitable for NR-U.

The present application describes mechanisms for controlling and signaling starting offsets for UL transmissions in a frequency spectrum shared by multiple network operating entities. In the disclosed embodiments, a BS may control the starting offset of a UL transmission to provide a certain gap duration for LBTs. For example, the BS may schedule a UE to transmit a UL signal after a DL signal. The UL signal may be aligned to a UL symbol boundary according to the BS's timeline. The DL signal may be aligned to a DL symbol boundary to the BS's timeline. The BS may configure the UE to apply a CP extension of a certain length to the UL signal to provide a certain DL-to-UL gap duration. Alternatively, the BS may schedule a UE to transmit a first UL signal after a second UL signal transmitted by the same UE and/or a different UE. Similarly, the first and second UL signals may be aligned to the BS's UL symbol boundary. The BS may configure the UE to apply a CP extension of a certain length to the first UL signal to provide a certain UL-to-UL gap duration between the first and second UL signals. The BS may control the LBT type (e.g., a CAT1 LBT or CAT2 LBT) for a scheduled UL transmission by controlling the transmission gap prior to the scheduled UL transmission. The BS may configure a length for the CP extension based on the transmission gap duration required for the desired LBT type. The BS may determine a set of CP extension lengths for various combination of gaps (e.g., UL-to-UL gap and DL-to-UL gap) and LBT types (e.g., CAT1 LBT and CAT2 LBT).

In an embodiment, the BS may transmit a UL scheduling grant for a UE to transmit a UL data signal (e.g., a physical uplink shared channel (PUSCH) signal) with a CP extension. For example, the UL scheduling grant can include CP extension length information. In an embodiment, the BS may transmit a DL scheduling grant for a UE to receive a DL data signal and provide a feedback (e.g., a physical uplink control channel (PUCCH)) for the DL data signal. The BS may schedule the UE to apply a CP extension to the feedback. For example, the DL scheduling grant can include scheduling information and CP extension length information.

In an embodiment, the BS may acquire a channel occupancy time (COT) in a channel. The BS may schedule one or more UEs for transmission within the COT. The BS may also schedule a UE to transmit outside of the COT. The BS may employ the same set of CP extension lengths and/or LBT types for UL transmissions within a COT and outside of the COT. Alternatively, the BS may employ the different sets of CP extension lengths and/or LBT types for UL transmissions within a COT and outside of the COT. In some instances, a BS may initially schedule a UL transmission during a period outside of a COT, but may subsequently acquire a COT in the channel before the period. Thus, the UL transmission may be within the newly acquired COT. The BS may provide rules for the UE to map the set of CP extension lengths for transmissions outside of a COT to the set of CP extension lengths for transmission within a COT.

In an embodiment, the BS may transmit multiple UL scheduling grants to schedule one or more UEs in contiguous transmission slots without gaps. Each grant may include a CP extension length configuration for a corresponding UL transmission. When a UE detects the multiple grants and is assigned to one of the contiguous slots, the UE may determine whether to apply a CP extension based on a signal detection in a previous slot. For example, if the UE detects a transmission in the previous slot, the UE may not apply a CP extension. However, if the UE fails to detect a transmission in the previous slot, the UE may apply a CP extension according to a corresponding CP extension length configuration.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105O and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a MIB, remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands. For example, the network 100 may be an NR-U network. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a BS 105 may acquire or reserve a TXOP or a channel occupancy time (COT) period in the shared channel by performing a CAT4 LBT. A CAT4 LBT refers to an LBT with a random backoff and a variable contention window. When the LBT passes, the BS 105 may schedule one or more UEs 115 for DL communications during the acquired COT period. The BS 105 may additionally schedule one or more UEs 115 for UL communications during the acquired COT period. Thus, multiple communication link direction switches can occur within the acquired COT period. In some examples, the BS 105 may schedule the UL and/or DL communications to create certain transmission gaps between a DL communication and a UL communication and/or between two UL communications to allow for certain types of LBTs to be performed prior to a transmission. Mechanisms for controlling the transmission gaps are described in greater detail herein.

FIGS. 2-5 illustrate various transmission schemes with transmission gaps, for example, a DL-to-UL gap or a UL-to-UL gap. In FIGS. 2-5, the schemes 200-500 may be employed by a BS such as the BSs 105 and a UE such as the UEs 115 in a network such as the network 100 over a spectrum (e.g., a shared spectrum or an unlicensed spectrum) shared by multiple network operating entities. In particular, a BS may employ the schemes 200, 300, 400, and/or 500 to schedule one or more UEs for communications with transmission gaps for link direction switches or transmission gaps among transmission in the same link direction. Additionally, the x-axes represent time in some arbitrary units.

Figure 2:
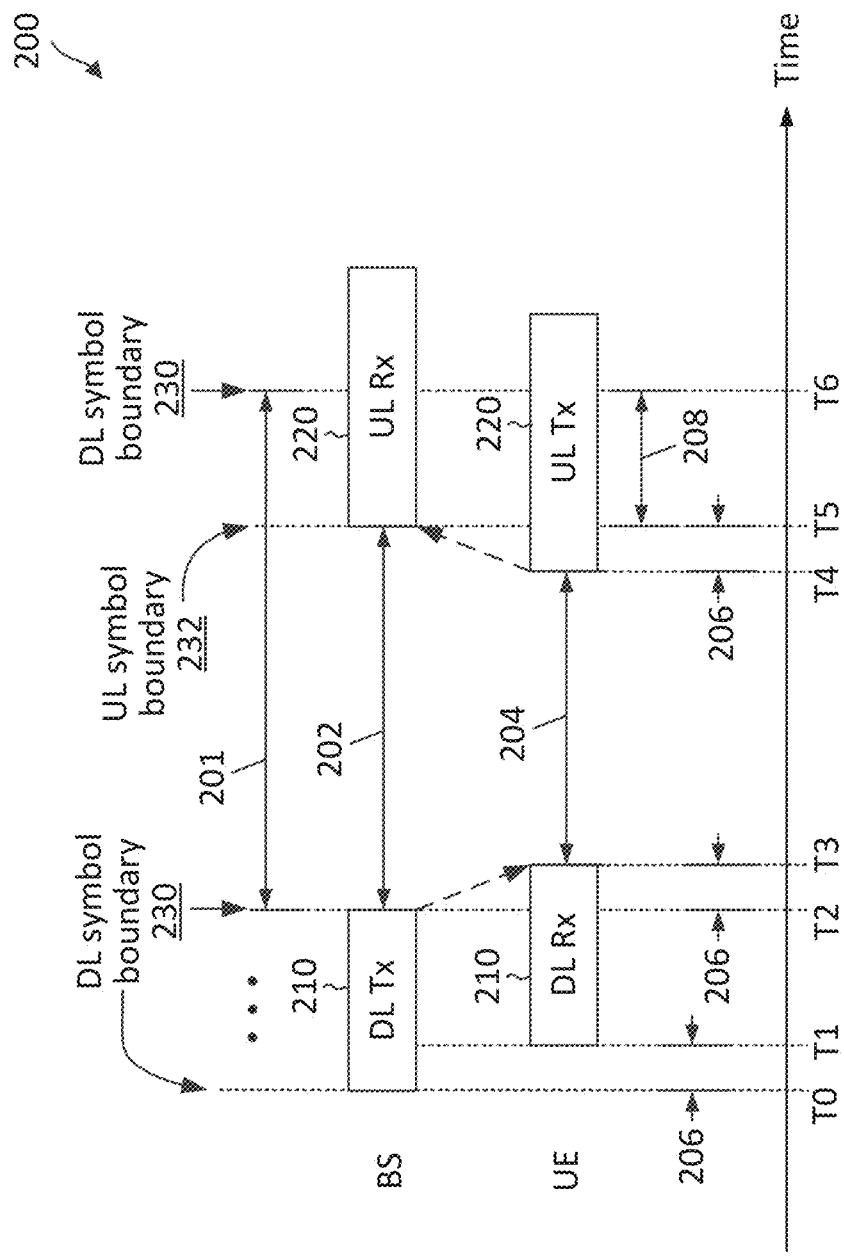
FIG. 2 is a timing diagram illustrating a transmission scheme including a downlink-to-uplink (DL-to-UL) gap according to some embodiments of the present disclosure.

FIG. 2 is a timing diagram illustrating a transmission scheme 200 including a DL-to-UL gap according to some embodiments of the present disclosure. The scheme 200 illustrates a DL symbol, boundary 230 and a UL symbol boundary 232 at a BS (e.g., BS 105 in FIG. 1). The UL symbol boundary 232 is ahead of the DL symbol boundary 230 by an offset period 208, for example, to allow time for the BS to switch from a DL communication direction to a UL communication direction. The offset period 208 may be referred to as a timing advance (TA) offset. In the scheme 200, DL communications are aligned to the DL symbol boundary 230 according to the BS's timeline, while UL communications are aligned to the UL symbol boundary 232 according to BS's timeline.

For example, at time T0, the BS transmits a DL signal 210 including one or more symbols aligned to a DL symbol boundary 230. For simplicity of illustrations, a DL symbol boundary 230 is shown at the beginning of the DL signal 210 and a DL symbol boundary 230 is shown at the end of the DL signal 210. However, there may be one or more DL symbol boundaries 230 within the duration of the DL signal 210 where the one or more symbols may be aligned to. Each symbol may include a CP portion and a useful portion. The useful portions of one or more symbols may include at least one of DL data, DL control, and/or one or more reference signals. In the of NR, the DL data may correspond to PDSCH, the DL control may correspond to PDCCH, and the reference signals may correspond to DMRSs. At time T1, the DL signal 210 arrives at the UE after a propagation delay 206. The BS completes the transmission of the DL signal 210 at time T2 aligned to a DL symbol boundary 230 and after the propagation delay 206, at time T3, the UE completes the reception of the DL signal 210.

The BS schedules a UE (e.g., UE 115 in FIG. 1) for a UL transmission at time T5, aligned to the UL symbol boundary 232, after the DL signal 210. To account for the propagation delay 206 between the BS and the UE, the UE begins the transmission of a UL signal 220 at an earlier time T4. In an example, the UE may determine a round-trip delay when performing a random access procedure with the BS. The propagation delay 206 is half the round-trip delay. The UL signal 220 includes one or more symbols. The useful portions of one or more symbols may include UL data, UL control information, and/or one or more reference signal. In the context of NR, the UL data may correspond to PUSCH, the UL control information may correspond to PUCCH, and the reference signals may correspond to DMRSs.

As an example, the DL-to-UL turn-around time at the BS may be about one symbol (e.g., a symbol duration 201) long. Thus, at the BS, the gap duration 202 between the end of the DL signal 210 and the beginning of UL signal 220 can be expressed as shown below:

$$\text{Gap duration } 202 = T_{symbol} - T_{TAoffset}, \quad (1)$$

where $T_{symbol}$ represents a symbol duration 201 and $T_{TAoffset}$ represents the offset period 208 between the UL symbol boundary 232 and the DL symbol boundary 230. At the UE, the gap duration 204 between the DL signal 210 and the UL signal 220 can be expressed as shown below:

$$\text{Gap duration } 204 = T_{symbol} - T_{TAoffset} - T_{TA}, \quad (2)$$

where $T_{TA}$ represents a timing advance or a round trip delay, which is two times the propagation delay 206.

When the scheme 200 is applied to a small cell scenario, the cell may have a relatively small radius (e.g., about 300 meters (m)). Thus, the timing advance may be relatively small (e.g., less than about 1 μs). As such, the gap duration 202 at the BS and the gap duration 204 at the UE may be about the same.

Figure 3:
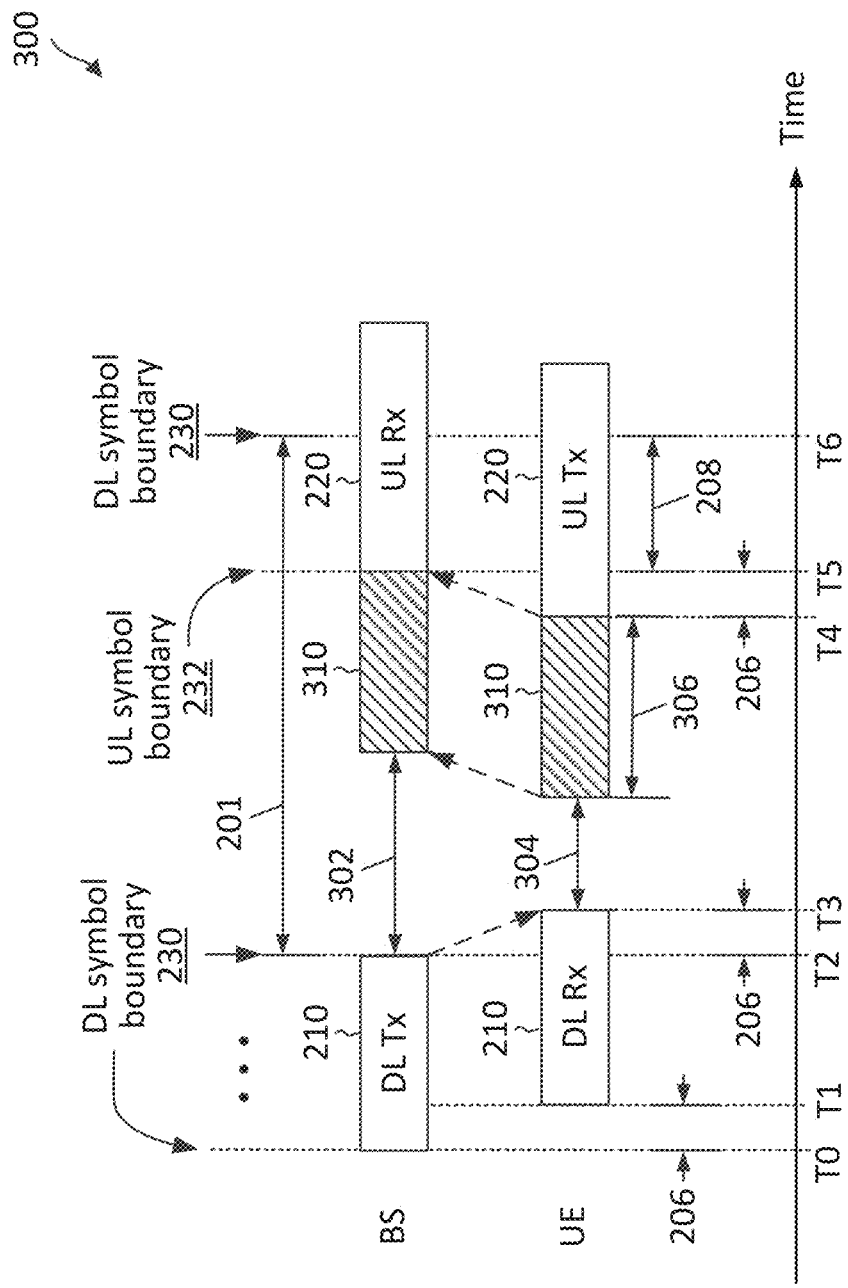
FIG. 3 is a timing diagram illustrating a transmission scheme including a DL-to-UL gap according to some embodiments of the present disclosure.

FIG. 3 is a timing diagram illustrating a transmission scheme 300 including a DL-to-UL gap according to some embodiments of the present disclosure. The scheme 300 is substantially similar to the scheme 200, and may use the same reference numerals as in FIG. 2 for simplicity's sake. However, the scheme 300 further employs a CP extension to control the duration of a transmission gap. For example, a BS (e.g., BS 105 in FIG. 1) may configure a UE (e.g., UE 115 in FIG. 1) to prepend a beginning symbol of the UL signal 220 with a CP extension 310. The BS may configure the UE with a certain CP extension length or duration 306 at the UE for a certain LBT type (e.g., CAT1 LBT/no LBT or CAT2 LBT). The CP extension 310 may not carry information. The CP extension 310 functions as a filler, which may be dropped at a receiver (e.g., the BS). In an example, the CP extension 310 may include a copy of an end portion of a beginning symbol of the UL signal 220.

As an example, for a 30 kHz subcarrier spacing (SCS) in NR, the symbol duration 201, $T_{symbol}$, may be about 35 µs long and the offset period 208, $T_{TAoffset}$, may be about 13 µs long. Thus, the duration 306 of the CP extension 310 may computed using equation (2). For example, when the desired gap duration is about 16 µs, the duration 306 of the CP extension 310 may be about 5 µs to about 6 µs depending on the $T_{TA}$ value. As similarly described above, for a small cell, where the $T_{TA}$ value may be small, the gap duration 302 at the BS and the gap duration 304 at the UE may be about the same.

Figure 4:
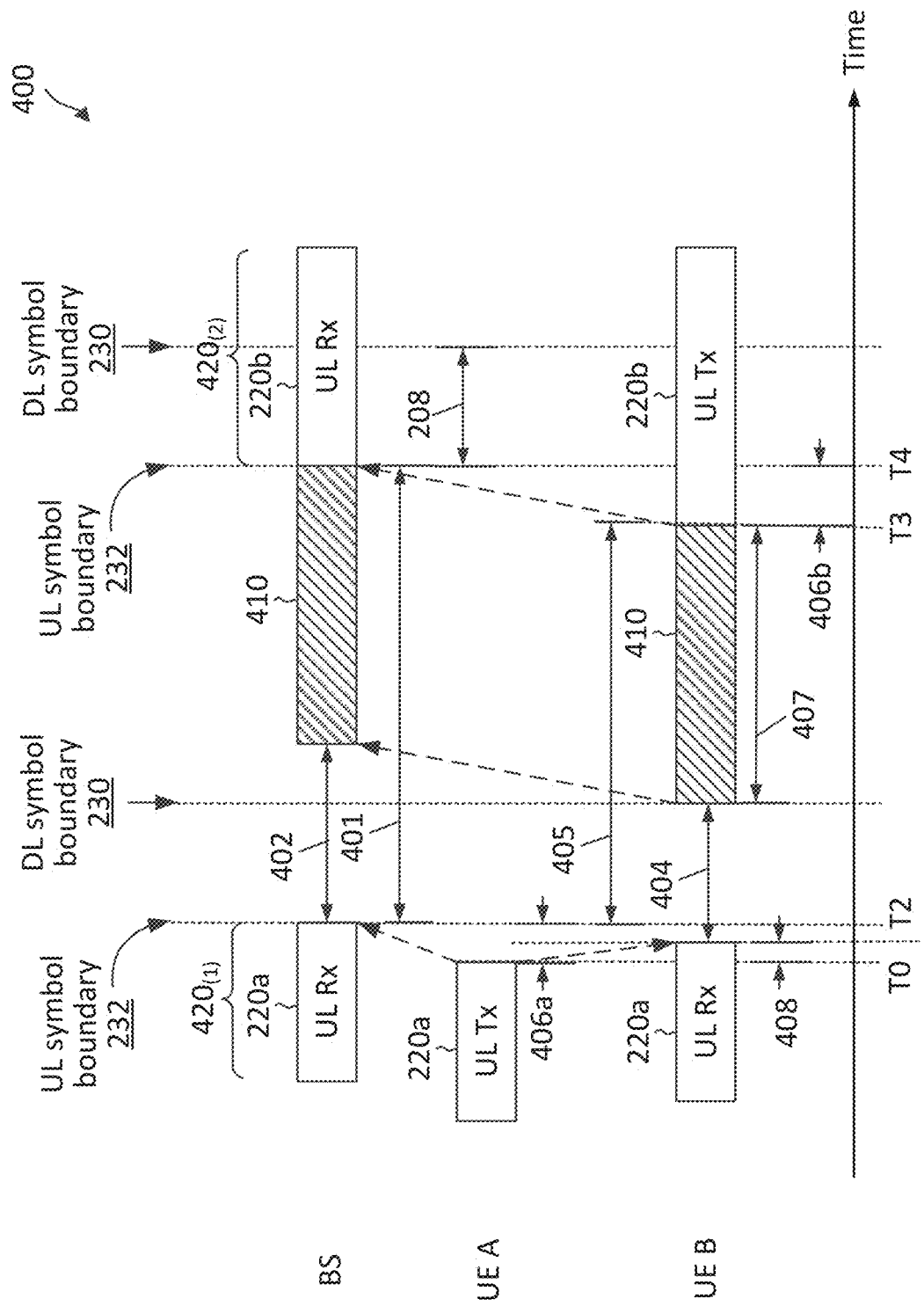
FIG. 4 is a timing diagram illustrating a transmission scheme including an uplink-to-uplink (UL-to-UL) gap according to some embodiments of the present disclosure.

FIG. 4 is a timing diagram illustrating a transmission scheme 400 including a UL-to-UL gap according to some embodiments of the present disclosure. The scheme 400 is described using the same transmission configuration as in the schemes 200 and 300, where UL transmissions are aligned to the UL symbol boundary 232, and may use the same reference numerals as in FIGS. 2 and 3 for simplicity's sake. In the scheme 400, a BS (e.g., BS 105 in FIG. 1) may schedule a UE A (e.g., UE 115 in FIG. 1) to transmit a UL signal 220a in a slot $420_{(1)}$ and a UE B (e.g., UE 115 in FIG. 1) to transmit a UL signal 220b in a next slot $420_{(2)}$. The slots 420 may be spaced apart by one symbol. In other words, the gap duration 401 between the UL signal 220a and the UL signal 220b corresponds to one symbol duration 201. The gap duration 401 may be referred to as an initial gap duration. Each slot 420 may include one or more symbols aligned to the UL symbol boundary 232 at the BS. For simplicity of illustrations and discussions, FIG. 4 only illustrates the UL symbol boundary 232 at the end of the UL signal 220a and the UL symbol boundary 232 at the beginning of the UL signal 220b.

The UE A starts the transmission of the UL signal 220a at an earlier time than the scheduled slot $420_{(1)}$ to account for a propagation delay 406a between the UE A and the BS. The UE B may also receive the UL signal 220a after a propagation delay 408. As shown, the UE A completes the transmission of the UL signal 220a at time T0, the BS completes the reception of the UL signal 220a at time T2, and the UE B completes the reception of the UL signal 220a at time T1. Similarly, the UE B starts the transmission of the UL signal 220b at an earlier time than the scheduled slot $420_{(2)}$ to account for a propagation delay 406b between the UE B and the BS. As shown, the UE B begins the transmission of the UL signal 220b at time T3 and the BS begins the reception of the UL signal 220b at time T4.

At the UE B, the gap duration 405 between the end of the UL signal 220a and the beginning of the UL signal 220b can be expressed as shown below:

$$\text{Gap duration 405} = T_{symbol} + \frac{T_{TA1}}{2} - \frac{T_{TA2}}{2} - P_{12}, \quad (3)$$

where $$\frac{T_{TA1}}{2}$$

represents the propagation delay 406a from the UE A to the BS, $$\frac{T_{TA2}}{2}$$

represents the propagation delay 406b from the UE B to the BS, and $P_{12}$ represents the propagation delay 408 from the UE A to the UE B. For a small cell, $T_{TA1}$, $T_{TA2}$, and $P_{12}$ are relatively small. Thus, the gap duration 405 may be about one symbol duration 201 similar to the gap duration 401 at the BS.

Similar to the scheme 300, the BS may configure the UE B to prepend a beginning symbol of the UL signal 220b with a CP extension 410 (e.g., the CP extension 310). The BS may configure the UE B with a certain CP extension length or duration 407 to provide a gap duration 404 at the UE B for a certain LBT type (e.g., CAT1 LBT/no LBT or CAT2 LBT). For example, when the gap duration 404 is less than about 16 µs, the UE B may transmit the UL signal 210b without performing an LBT. Otherwise, the UE B may perform a CAT2 LBT prior to transmitting the UL signal 210b.

Figure 5:
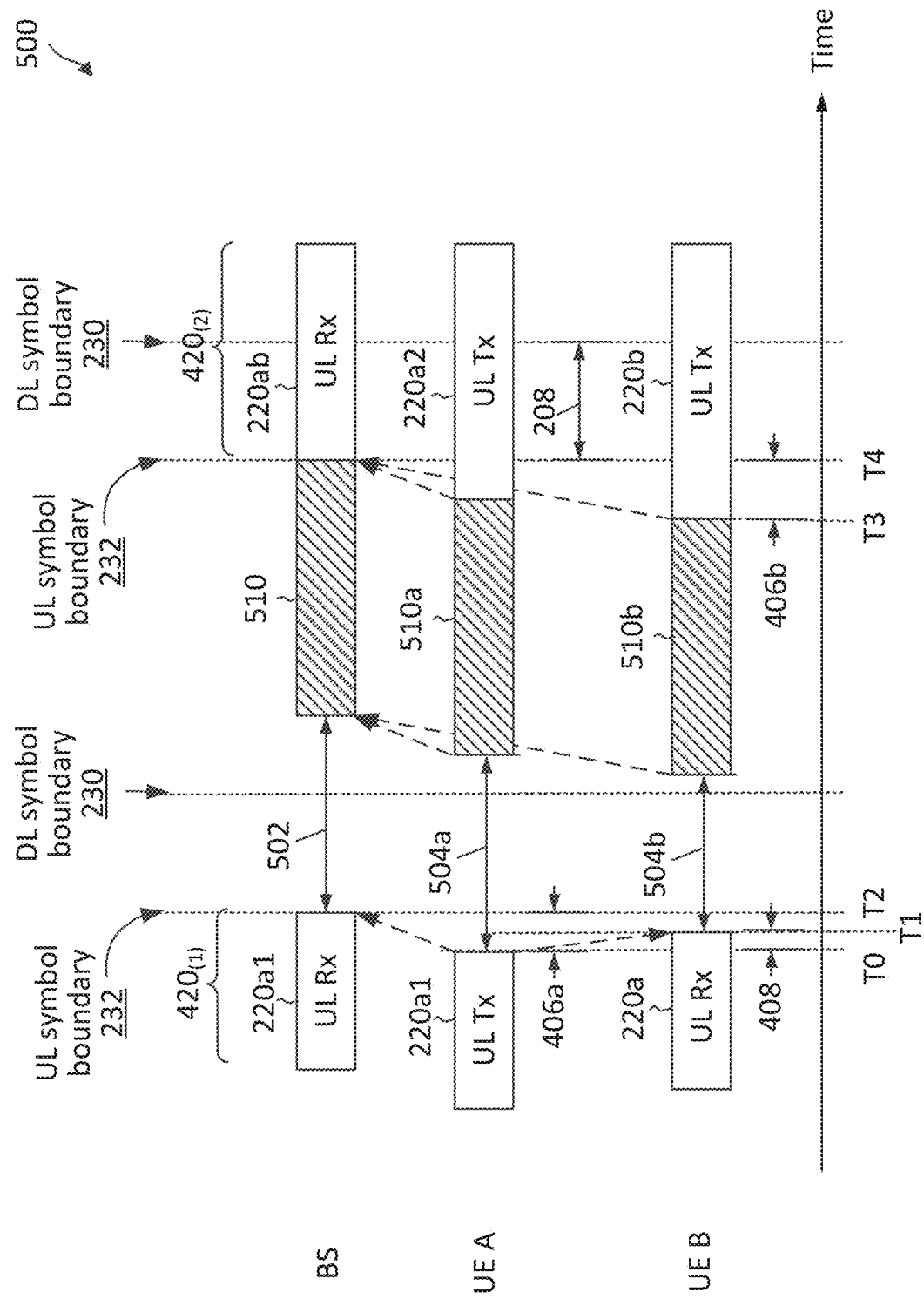
FIG. 5 is a timing diagram illustrating a transmission scheme including a UL-to-UL gap according to some embodiments of the present disclosure.

FIG. 5 is a timing diagram illustrating a transmission scheme 500 including a UL-to-UL gap according to some embodiments of the present disclosure. The scheme 500 is substantially similar to the scheme 400, and may use the same reference numerals as in FIG. 4 for simplicity's sake. However, the scheme 500 illustrates the scenario where a UE B may join a UE A's transmission. In the scheme 500, a BS (e.g., BS 105 in FIG. 1) may schedule a UE A (e.g., UE 115 in FIG. 1) to transmit a UL signal 220a1 in the slots $420_{(1)}$ and a UL signal 220a2 in the slot $420_{(2)}$. The BS may additionally schedule a UE B (e.g., UE 115 in FIG. 1) to transmit a UL signal 220b in the $420_{(2)}$. The BS may receive the UL signal 220a1 in the slot $420_{(2)}$ and receive both the UL signal 220a2 and the UL signal 220b (shown as 220ab) in the slot $420_{(2)}$.

Similar to the scheme 400, the UE A may account for the propagation delay 406a for the both transmissions of the UL signal 220a1 and 220a2. The UE B may account for the propagation delay 406b for the transmission of the UL signal 220b.

As described above, for a small cell, the propagation delays 406a (e.g., $T_{TA1}$), 406b (e.g., $T_{TA2}$), and 408 (e.g., $P_{12}$) are relatively small. Thus, the gap duration at the BS, the UE A, and the UE B may all be in the range of one symbol duration 201. Similar to the scheme 400, the BS may configure the UE A to prepend a beginning symbol of the UL signal 220a2 with a CP extension 510a (e.g., the CP extension 310) and the UE B to prepend a beginning symbol of the UL signal 220b with a CP extension 510b. The BS may configure a length for the CP extension 510a to provide a gap duration 504a at the UE A for a certain LBT type (e.g., CAT1 LBT/no LBT or CAT2 LBT). Similarly, the BS may configure a length for the CP extension 510b to provide a gap duration 504b at the UE B for a certain LBT type (e.g., CAT1 LBT/no LBT or CAT2 LBT). In some instances, the gap duration 504a at the UE A and the gap duration 504b at the UE may be about the same. In some other instances, the gap duration 504a at the UE A and the gap duration 504b at the UE may be different.

As can be observed from the schemes 200-500, there may be two different gap durations at a UE (e.g., the UEs 115) without any CP extension for a small cell deployment. For example, a UL-to-UL gap (e.g., the gap duration 405) at any UE may be about $T_{symbol}$ long and a DL-to-UL gap (e.g., the gap duration 204) at any UE may be about ($T_{symbol}-T_{TAoffset}$) long.

According to embodiments of the present disclosure, a BS may control or reduce the gap duration to a target duration for a certain LBT type by configuring a UE to apply a CP extension to a UL transmission. The BS may signal CP extension length information to the UE. The UE may apply the CP extension according to the CP extension length information to provide the desired or target transmission gap.

Figure 6:
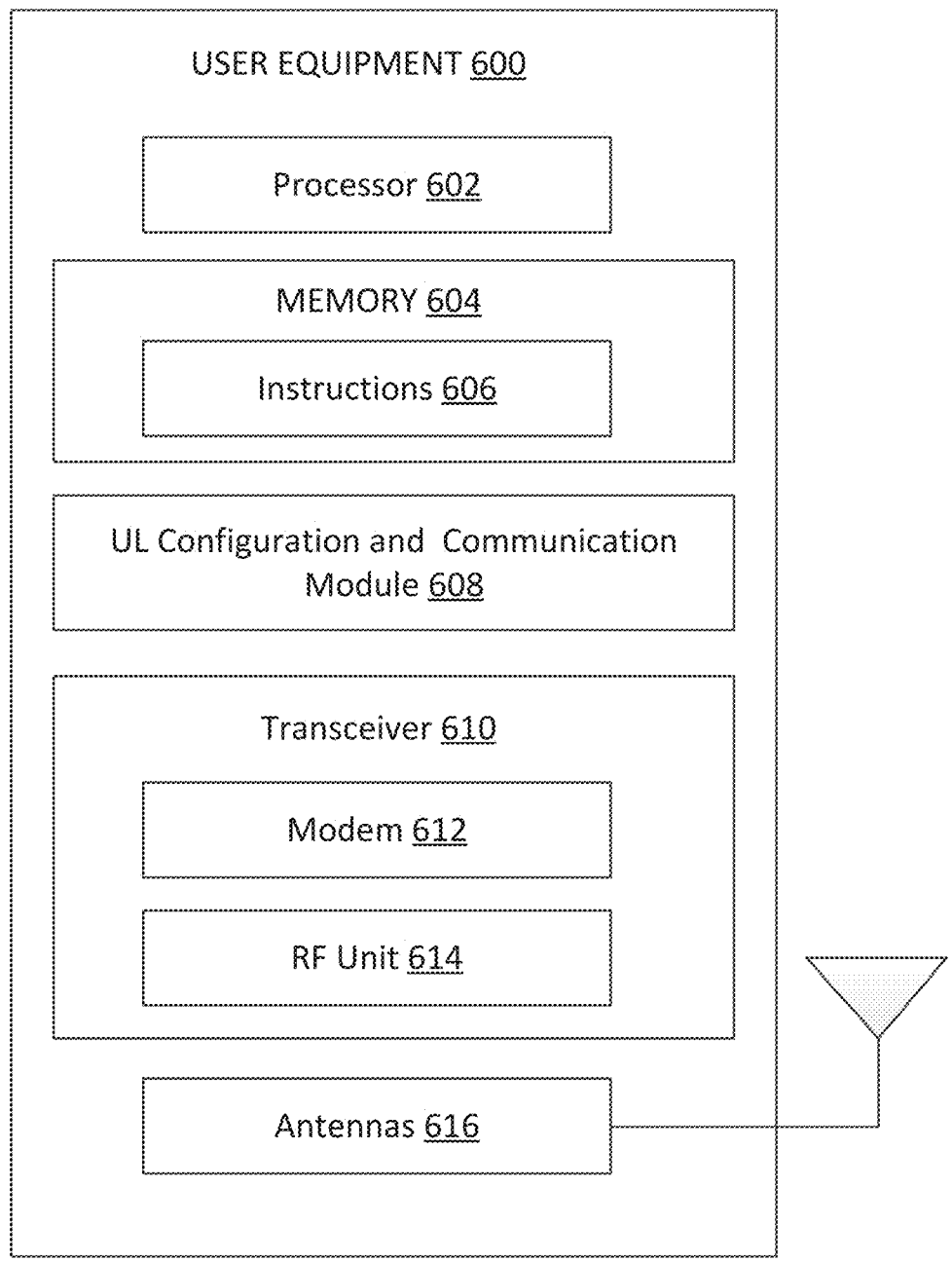
FIG. 6 is a block diagram of a user equipment (UE) according to some embodiments of the present disclosure.

FIG. 6 is a block diagram of an exemplary UE 600 according to embodiments of the present disclosure. The UE 600 may be a UE 115 in the network 100 as discussed above in FIG. 1. As shown, the UE 600 may include a processor 602, a memory 604, a UL configuration and communication module 608, a transceiver 610 including a modem subsystem 612 and a radio frequency (RF) unit 614, and one or more antennas 616. These elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 604 includes a non-transitory computer-readable medium. The memory 604 may store instructions 606. The instructions 606 may include instructions that, when executed by the processor 602, cause the processor 602 to perform the operations described herein with reference to the UEs 115 in connection with embodiments of the present disclosure, for example, aspects of FIGS. 2-5 and 8-14. Instructions 606 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The UL configuration and communication module 608 may be implemented via hardware, software, or combinations thereof. For example, the UL configuration and communication module 608 may be implemented as a processor, circuit, and/or instructions 606 stored in the memory 604 and executed by the processor 602. In some examples, the UL configuration and communication module 608 can be integrated within the modem subsystem 612. For example, the UL configuration and communication module 608 can be implemented by a combination of software components (e.g., executed by a DSP or a general processor) and hardware components (e.g., logic gates and circuitry) within the modem subsystem 612.

The UL configuration and communication module 608 may be used for various aspects of the present disclosure, for example, aspects of FIGS. 2-5 and 8-14. The UL configuration and communication module 608 is configured to receive a CP extension length configuration from a BS (e.g., the BSs 105) for providing a gap duration for an LBT associated with a first communication signal, determine an LBT type (e.g., a CAT1 LBT or a CAT2 LBT) based on the CP extension length configuration, perform an LBT based on the determined LBT types, transmit the first communication signal including a CP extension having a length based on the CP extension length configuration. For example, the first communication includes one or more symbols aligned to a symbol boundary, where a beginning symbol of the one or more symbols is prepended with the CP extension.

In an embodiment, the UL configuration and communication module 608 may to receive a UL scheduling grant for the first communication signal from the BS. The first communication may be a PUSCH signal. The UL scheduling grant may include the CP extension length configuration.

In an embodiment, the UL configuration and communication module 608 may receive a DL scheduling grant for a DL data signal (e.g., a PDSCH signal) from the BS. The first communication signal may be a PUCCH signal including an acknowledgment (ACK)/negative-acknowledgement (NACK) feedback for the DL data signal.

In an embodiment, the UL configuration and communication module 608 may receive a scheduling grant for outside of a COT and/or a CP extension length mapping for mapping from the BS. The CP extension length mapping may map a CP extension length for a transmission outside of a COT to a CP extension length for a transmission within a COT. The UL configuration and communication module 608 may generate a CP extension based on the scheduling grant and/or the mapping depending on whether the BS acquire another COT before the pre-grant.

In an embodiment, the UL configuration and communication module 608 may detect multiple grants from the BS granting UL transmissions for one or more UEs including the UE 600 in contiguous slots. The UL configuration and communication module 608 may perform signal detection in a slot before the slot granted to the UE 600 and determine whether to apply a CP extension based on the signal detection. Mechanisms for applying CP extensions to provide a gap duration suitable for a certain LBT are described in greater detail herein.

As shown, the transceiver 610 may include the modem subsystem 612 and the RF unit 614. The transceiver 610 can be configured to communicate bi-directionally with other devices, such as the BSs 105. The modem subsystem 612 may be configured to modulate and/or encode the data from the memory 604, and/or the UL configuration and communication module 608, according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 115 to enable the UE 115 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The antennas 616 may include multiple antennas of similar or different designs in order to sustain multiple transmission links. The RF unit 614 may configure the antennas 616.

In an embodiment, the UE 600 can include multiple transceivers 610 implementing different RATs (e.g., NR and LTE). In an embodiment, the UE 600 can include a single transceiver 610 implementing multiple RATs (e.g., NR and LTE). In an embodiment, the transceiver 610 can include various components, where different combinations of components can implement RATs.

Figure 7:
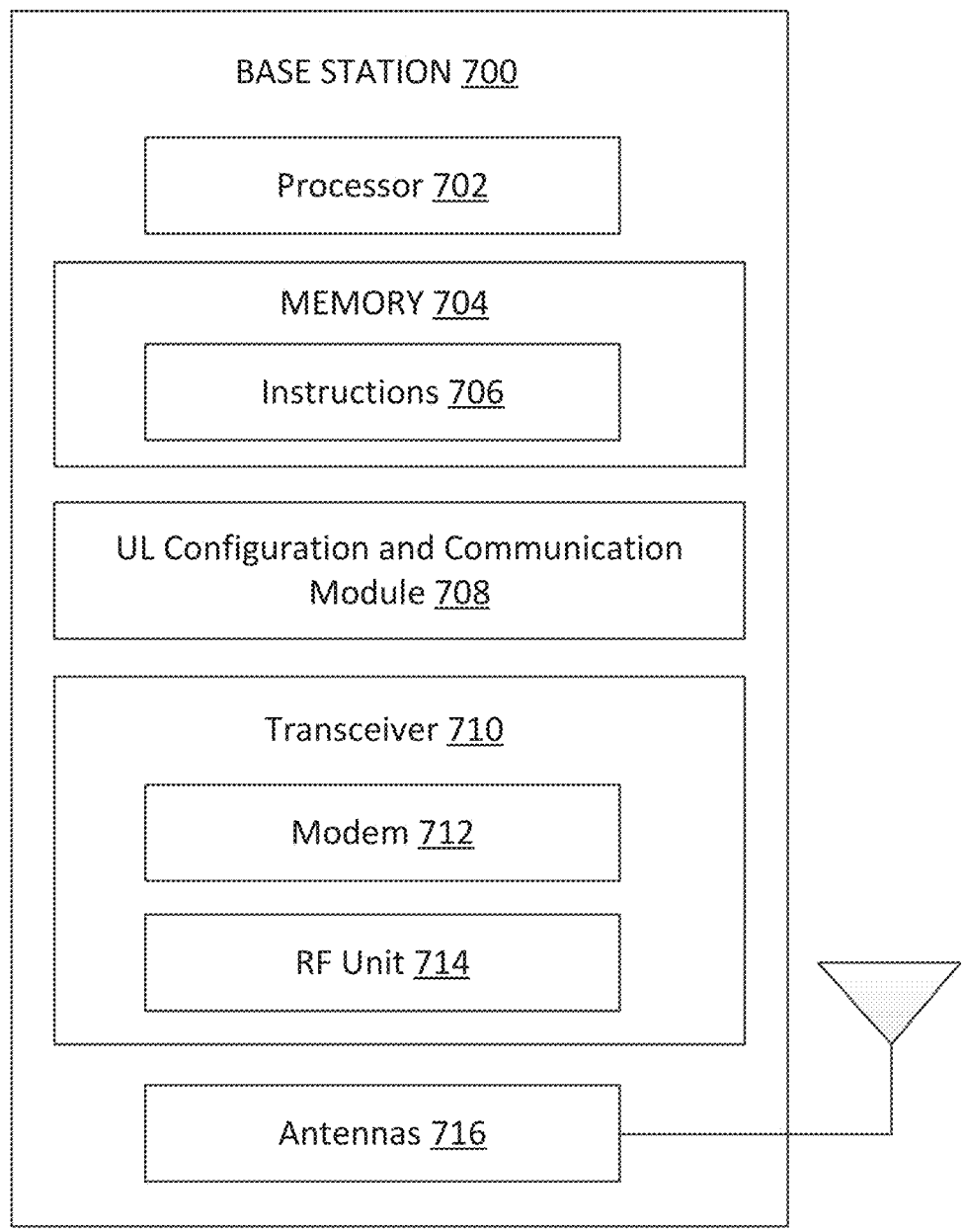
FIG. 7 is a block diagram of an exemplary base station (BS) according to some embodiments of the present disclosure.

FIG. 7 is a block diagram of an exemplary BS 700 according to embodiments of the present disclosure. The BS 700 may be a BS 105 in the network 100 as discussed above in FIG. 1. A shown, the BS 700 may include a processor 702, a memory 704, a UL configuration and communication module 708, a transceiver 710 including a modem subsystem 712 and a RF unit 714, and one or more antennas 716. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 2-5 and 8-14. Instructions 706 may also be referred to as code, which may be interpreted broadly to include any type of computer-readable statement(s) as discussed above with respect to FIG. 6.

The UL configuration and communication module 708 may be implemented via hardware, software, or combinations thereof. For example, the UL configuration and communication module 708 may be implemented as a processor, circuit, and/or instructions 706 stored in the memory 604 and executed by the processor 702. In some examples, the UL configuration and communication module 708 can be integrated within the modem subsystem 712. For example, the UL configuration and communication module 708 can be implemented by a combination of software components (e.g., executed by a DSP or a general processor) and hardware components (e.g., logic gates and circuitry) within the modem subsystem 712.

The UL configuration and communication module 708 may be used for various aspects of the present disclosure, for example, aspects of FIGS. 2-5 and 8-14. The UL configuration and communication module 708 is configured to transmit a CP extension length configuration to UE (e.g., the UEs 115 and 600) for providing a gap duration for an LBT associated with a first communication signa and, receive the first communication signal including a CP extension having a length based on the CP extension length configuration. For example, the first communication includes one or more symbols aligned to a symbol boundary, where a beginning symbol of the one or more symbols is prepended with the CP extension.

In an embodiment, the UL configuration and communication module 708 may to transmit a UL scheduling grant for the first communication signal to the UE. The first communication may be a PUSCH signal. The UL scheduling grant may include the CP extension length configuration.

In an embodiment, the UL configuration and communication module 708 may transmit a DL scheduling grant for a DL data signal (e.g., a PDSCH signal) to the BS. The first communication signal may be a PUCCH signal including an ACK/NACK feedback for the DL data signal.

In an embodiment, the UL configuration and communication module 608 may transmit a scheduling grant for outside of a COT and/or a CP extension length mapping for mapping from the BS. The CP extension length mapping may map a CP extension length for a transmission outside of a COT to a CP extension length for a transmission within a COT.

In an embodiment, the UL configuration and communication module 708 may transmit multiple grants granting UL transmissions for one or more UEs in contiguous slots. Mechanisms for controlling transmission gaps for certain LBT types by configuring UEs to apply CP extensions are described in greater detail herein.

As shown, the transceiver 710 may include the modem subsystem 712 and the RF unit 714. The transceiver 710 can be configured to communicate bi-directionally with other devices, such as the UEs 115 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or 600. The RF unit 7514 may be further configured to perform analog beamforming in conjunction with the digital beamforming. Although shown as integrated together in transceiver 710, the modem subsystem 712 and/or the RF unit 714 may be separate devices that are coupled together at the BS 105 to enable the BS 105 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, transmission of information to complete attachment to a network and communication with a camped UE 115 or 700 according to embodiments of the present disclosure. The antennas 716 may further receive data messages transmitted from other devices and provide the received data messages for processing and/or demodulation at the transceiver 710. The antennas 716 may include multiple antennas of similar or different designs in order to sustain multiple transmission links.

In an embodiment, the BS 700 can include multiple transceivers 710 implementing different RATs (e.g., NR and LTE). In an embodiment, the BS 700 can include a single transceiver 710 implementing multiple RATs (e.g., NR and LTE). In an embodiment, the transceiver 710 can include various components, where different combinations of components can implement RATs.

Figure 8:
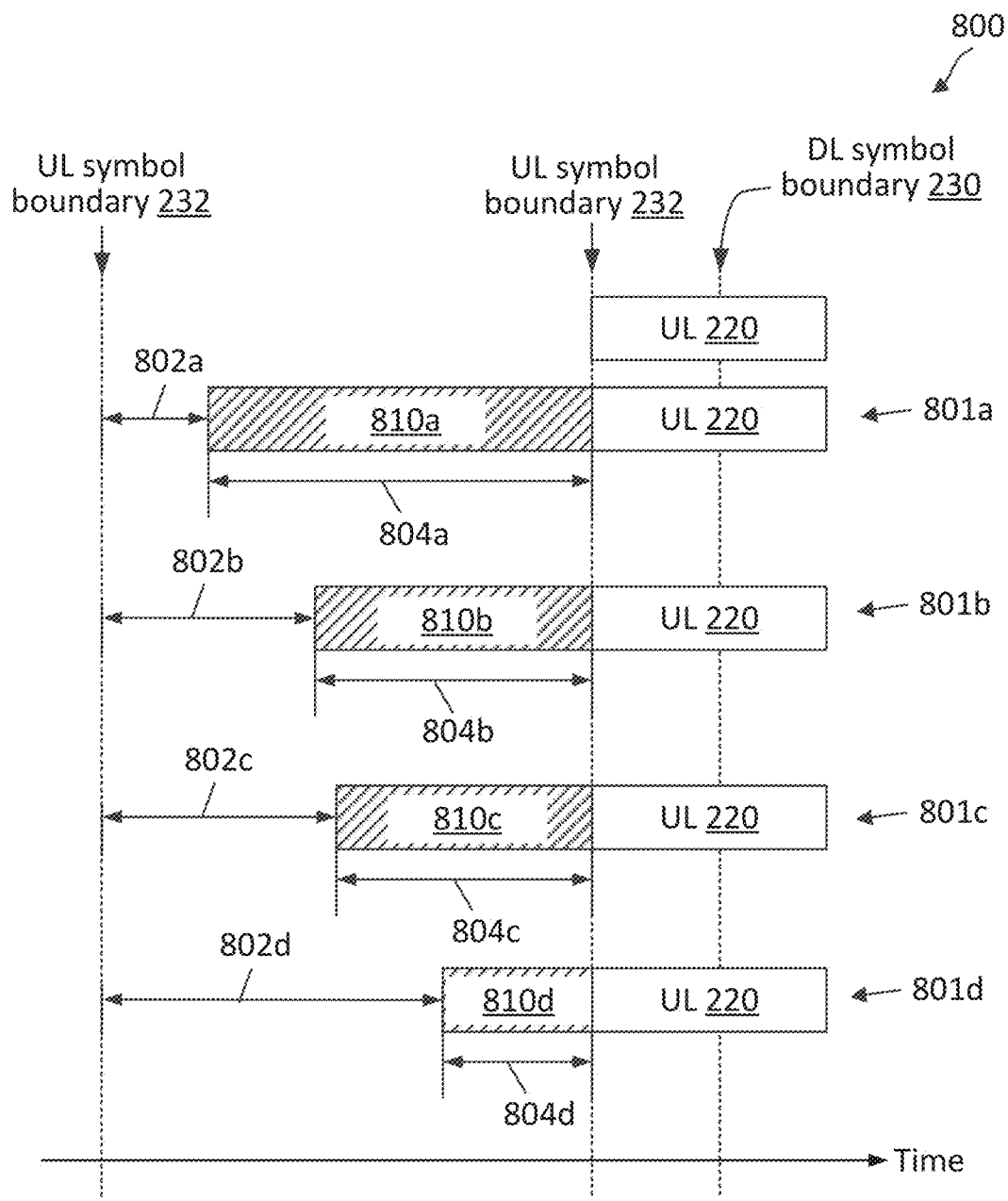
FIG. 8 is a timing diagram illustrating a cyclic prefix (CP) extension length signaling scheme according to some embodiments of the present disclosure.

FIG. 8 is a timing diagram illustrating a CP extension length signaling scheme 800 according to some embodiments of the present disclosure. The scheme 800 may be employed by a BS such as the BSs 105 and a UE such as the UEs 115 in a network such as the network 100 over a spectrum (e.g., a shared spectrum or an unlicensed spectrum) shared by multiple network operating entities. In particular, the BS may employ the scheme 800 to configure the UE to apply a CP extension. In FIG. 8, the x-axis represent time in some arbitrary units. The scheme 800 is described using the same transmission configuration as in the schemes 200-500, where UL and DL communications are aligned to a UL symbol boundary 232 and a DL symbol boundary 230, respectively, at the BS, and may use the same reference numerals as in FIGS. 2-5 for simplicity's sake. In the scheme 800, a BS may schedule a UE for a UL transmission (e.g., the UL signal 220) aligned to the UL symbol boundary 232. The BS may configure the UE to apply a CP extension to the UL transmission to provide a certain gap duration for LBT.

As described above, when a transmission gap is less than about 16 μs, a UE may transmit after the transmission gap without performing an LBT (i.e., a no LBT mode or CAT1 LBT). However, when a transmission gap is between about 16 μs and about 25 μs, the UE is to perform a CAT2 LBT before transmitting after the transmission gap. Thus, if the BS desires to have the UE to perform no LBT after a transmission gap, the BS may configure a transmission gap with a duration to be less than 16 μs (e.g., $T_0 \leq 16$ μs). Alternatively, if the BS desires to have the UE to perform a CAT2 LBT after a transmission gap, the BS may configure a transmission gap duration to be between about 16 μs and about 25 μs (e.g., 16 μs<$T_1 \leq 25$ μs). In general, the BS may determine any suitable values for the $T_0$ and $T_1$ values.

To support DL-to-UL gaps and UL-to-UL gaps and the two target gap durations $T_0$ and $T_1$, the BS may signal CP extension lengths using one of the four options 801a, 801b, 801c, and 801d. In some examples, the BS may further preconfigure the UE with the target duration $T_0$ for a no LBT mode and the target duration $T_1$ for a CAT2 LBT mode. In some examples, the target duration $T_0$ for a no LBT mode and the target duration $T_1$ for a CAT2 LBT mode may have predetermined values for a particular wireless communication protocol.

Thus, the BS may signal the option 801a for a UL-to-UL gap with no LBT performed prior to the UL transmission. When the UE is configured with the option 801a, the UE may apply a CP extension 810a with a duration 804a to the UL signal 220 such that the transmission gap may have a gap duration of 802a (e.g., $T_0$) at the UE. The CP extension duration 804a may be computed as shown below:

$$\text{CP extension duration } 804a = T_{symbol} - T_0. \quad (4)$$

Accordingly, the UE may compute the duration 804a by

The BS may signal the option 801b for a UL-to-UL gap with a CAT2 LBT performed prior to the UL transmission. When the UE is configured with the option 801b, the UE may apply a CP extension 810b with a duration 804b to the UL signal 220 such that the transmission gap may have a gap duration 802b (e.g., $T_1$) at the UE. The UE may compute the CP extension duration 804b as shown below:

$$\text{CP extension duration } 804b = T_{symbol} - T_1. \quad (5)$$

The BS may signal the option 801c for a DL-to-UL gap with no LBT performed prior to the UL transmission. When the UE is configured with the option 801c, the UE may apply a CP extension 810c with a duration 804c to the UL signal 220 such that the transmission gap may have a gap duration 802c (e.g., $T_0 + T_{TAoffset}$) at the UE. The UE may compute the CP extension duration 804c as shown below:

$$\text{CP extension duration } 804c = T_{symbol} - T_{TAoffset} - T_0. \quad (6)$$

The BS may signal the option 801d for a DL-to-UL gap with a CAT2 LBT performed prior to the UL transmission. When the UE is configured with the option 801d, the UE may apply a CP extension 810d with a duration 804d to the UL signal 220 such that the transmission gap may have a gap duration 802d (e.g., $T_1 + T_{TAoffset}$) at the UE. The UE may compute the CP extension duration 804d as shown below:

$$\text{CP extension } 804d = T_{symbol} - T_{TAoffset} - T_1. \quad (7)$$

In addition to signaling CP extension length information, the options 801a, 801b, 801c, 801d also provide LBT mode information. For example, when a UE is configured with the option 801a, the UE may perform no LBT prior to the UL transmission (e.g., the UL signal 220 with the CP extension 810a). When a UE is configured with the option 801b, the UE may perform a CAT2 LBT for the UL transmission (e.g., the UL signal 220 with the CP extension 810b). When a UE is configured with the option 801c, the UE may perform no LBT prior to the UL transmission (e.g., the UL signal 220 with the CP extension 810c). When a UE is configured with the option 801d, the UE may perform a CAT2 LBT for the UL transmission (e.g., the UL signal 220 with the CP extension 810d).

As described above, for a 30 kHz SCS, $T_{symbol}$ may be about 35.7 μs and $T_{TAoffset}$ may be about 13 μs. Thus, $T_{symbol} - T_{TAoffset}$ may be about 22.7 μs. In case a transmission gap long than 22.7 μs is required, the initial gap duration without CP extension can be set to 2 symbols (e.g., $2 \times T_{symbol}$). In other words, the $T_{symbol}$ in the equations (4) to (7) may be replaced by $2 \times T_{symbol}$. Similarly, for a 60 kHz SCS, where the symbol duration may be about 17.9 μs, the initial gap duration can be set to N symbols (e.g., $N \times T_{symbol}$), where N may be about 2, 3, or 4 or more.

Figure 9:
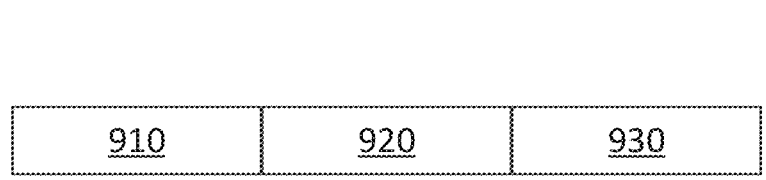
FIG. 9 is a block diagram illustrating a configuration message according to some embodiments of the present disclosure.

FIG. 9 is a block diagram illustrating a configuration message 900 according to some embodiments of the present disclosure. The configuration message 900 may be employed by a BS such as the BSs 105 to configure a UE such as the UEs 115 in a network such as the network 100 for transmission gap controls. The message 900 may include a CP extension length indicator 910, an LBT indicator 920, and/or a transmission duration shortening indicator 930.

In an example, the BS may transmit the message 900 in a downlink control information (DCI) messages. The BS may include any suitable combination of the CP extension length indicator 910, the LBT indicator 920, and the transmission duration shortening indicator 930 in a DCI message. Alternatively, the BS may transmit each of the CP extension length indicator 910, the LBT indicator 920, and the transmission duration shortening indicator 930 in a separate DCI message. In an example, the BS may transmit any of the CP extension length indicator 910, the LBT indicator 920, and the transmission duration shortening indicator 930 along with a UL scheduling grant (e.g., for a UL signal 220) in a DCI message. In an example, the BS may transmit one or more of the CP extension length indicator 910, the LBT indicator 920, and the transmission duration shortening indicator 930 in an RRC message, for example, for a semi-static configuration.

In an example, the CP extension length indicator 910 may include a length of about 2 bits. The CP extension length indicator 910 may indicate one of the options 801a, 801b, 801c, or 801d based on the scheme 800.

In an example, the LBT indicator 920 may include a length of about 1 bit. The LBT indicator 920 can indicate one value (e.g., a bit-value of 0) for a CAT2 LBT and another value (e.g., a bit-value of 1) for a CAT4 LBT. In an example, when the LBT indicator 920 indicates a CAT2 LBT, the UE may further select between the CAT1 LBT and the CAT2 LBT based on the CP extension length indicator 910. For example, when the CP extension length indicator 910 indicates a value corresponding to the option 801a or 801c, the UE may determine that no LBT or CAT1 LBT is require prior to a UL transmission. When the CP extension length indicator 910 indicates a value corresponding to the option 801b or 801d, the UE may perform a CAT2 LBT.

In an example, the transmission duration shortening indicator 930 include a length of about 1 bit. The transmission duration shortening indicator 930 may indicate one value (e.g., a bit-value of 0) for no transmission duration shortening and another value (e.g., a bit-value of 1) for ending a transmission duration early by one or more symbols symbol. As an example, a normal or regular transmission allocation may be about 14 symbols long and a shortened transmission allocation may be about 13 symbols long with the last symbol excluded. A UE may shorten a transmission by puncturing one or more end symbols of a UL transmission (e.g., the UL signal 220). Alternatively, the UE may rate-match to the number of symbols in the shortened UL transmission duration.

In some embodiments, the BS may select a $T_0$ value and a $T_1$ value such that the CP extension durations 804b and 804c may be substantially close. Thus, the set of CP extension lengths (indicated by the CP extension length indicator 910) can be reduced to 3 options instead of 4 options to reduce signaling overhead.

In some embodiments, the CP extension length indicator 910 may include an additional bit to indicate whether a UE may include the UE's timing advance or round-trip relay, $T_{TA}$, in the CP extension length computation. The UE's timing advance parameter may not be known by the BS and be computed by the UE locally.

In some embodiments, the BS may indicate the transmission duration information by including additional entries in a time-domain downlink resource allocation (TDRA) table instead of using the transmission duration shortening indicator 930. In other words, the TDRA table may include an entry for a 13 symbols long allocation and another entry for a 13 symbols long allocation.

In some embodiments, the BS may also schedule a DL scheduling grant with a shortened transmission duration. In other words, the BS may transmit a DL signal (e.g., the DL signal 210) with one or more end symbols punctured. Alternatively, the BS may rate-match to the number of symbols in the shortened DL transmission duration.

Figure 10:
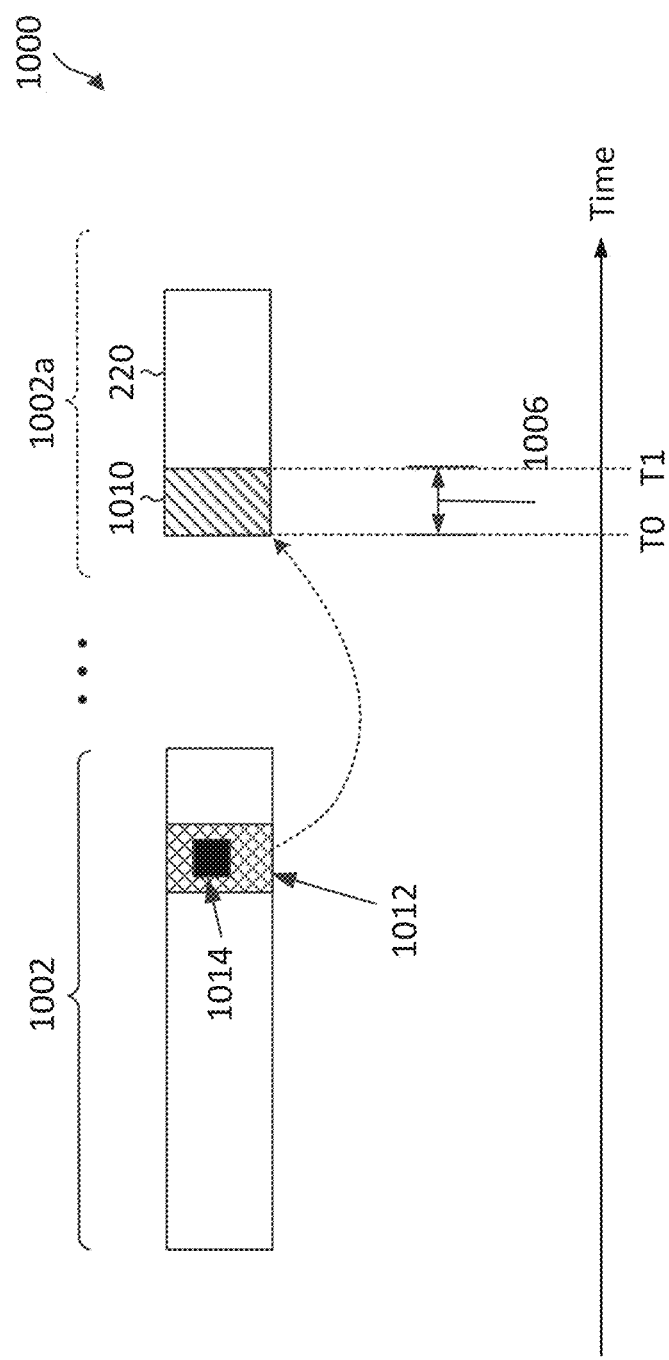
FIG. 10 is a timing diagram illustrating a transmission scheme including a UL transmission schedule that is outside of a channel occupancy time (COT) according to some embodiments of the present disclosure.

FIG. 10 is a timing diagram illustrating a transmission scheme 1000 including a UL transmission schedule that is outside of a COT according to some embodiments of the present disclosure. The scheme 1000 may be employed by a BS such as the BSs 105 and a UE such as the UEs 115 in a network such as the network 100 over a spectrum (e.g., a shared spectrum or an unlicensed spectrum) shared by multiple network operating entities. In FIG. 8, the x-axis represent time in some arbitrary units. In the scheme 1000, a BS may perform a CAT4 LBT in the channel. When the LBT is a pass, the BS acquires a COT 1002. The COT 1002 may include any suitable duration. In some examples, the COT 1002 may have a maximum allowable duration based on certain regulations. The COT 1002 may include one more slots (e.g., the slots 420). The BS may schedule one or more UEs for UL communications and/or DL communications during the COT 1002. Thus, the COT 1002 may include multiple link direction switching points.

In an example, the BS may schedule a UE for a UL transmission outside of the COT 1002. For example, the BS may transmit a UL scheduling grant 1012 during the COT 1002. The UL scheduling grant 1012 may schedule a UE for a UL transmission (e.g., the UL signal 220) beginning at time T1. For example, the UL scheduling grant 1012 may indicate time-frequency resources allocated for the UL transmission. The UL scheduling grant 1012 may include a CP extension length indicator 1014 for the UL transmission. The UE may prepend the UL signal 220 with a CP extension 1010. The UE may determine a length or duration 1006 for the CP extension 1010 based on the CP extension length indicator 1014.

In some examples, the BS may use the same set of CP extension lengths (e.g., the options 801a, 801b, 801c, and/or 801d) for a UL transmission within the COT 1002 and outside of the COT 1002. In some examples, the BS may use one set of CP extension lengths (e.g., the options 801a, 801b, 801c, and/or 801d) for UL transmissions within the COT 1002 and a different set of CP extension lengths for a UL transmission that is outside of the COT 1002. The set of CP extension lengths for a UL transmission outside of the COT 1002 may include a CP extension length of 0 (e.g., a starting offset of 0 without any CP extension). In addition, the UL scheduling grant 1012 may indicate a CAT4 LBT for the UL transmission.

In an embodiment, after the COT 1002 ended, the BS may subsequently contend for the channel again (e.g., by performing another CAT4 LBT) before the UE transmits the UL signal 220 pre-granted by the scheduling grant 1012. The BS may win the contention and gain access to another COT 1002a in the channel as shown by the dotted bracket. Thus, the UL transmission scheduled for outside of the COT 1002 may be within the newly acquired COT 1002a. If the BS configures the same set of CP extension lengths for a UL transmission within a COT and outside of a COT, the UE may generate the CP extension 1010 using the same mechanisms as in the scheme 800. However, if the BS configures different sets of CP extension lengths for a UL transmission within a COT and a UL transmission outside of a COT, the UE may convert or map a CP extension length indicated by the CP extension length indicator 1014 to a CP extension length for transmission within a COT. In other words, the UE may apply a mapping to the CP extension length indicated by the CP extension length indicator 1014 to one of the options 801a, 801b, 801c, and 801d. In addition, the UE may fall back to perform a CAT2 LBT instead of a CAT4 LBT for the transmission.

In an example, the UE CP extension length mapping can be predetermined. In an example, the BS can indicate the UE CP extension length mapping in a COT-structure information (COT-SI) message along with other COT information (e.g., including a COT duration and/or UL/DL slot configuration information). In an example, the BS can indicate the UE CP extension length mapping in a group common-PDCCH (GC-PDCCH) message.

Figure 11:
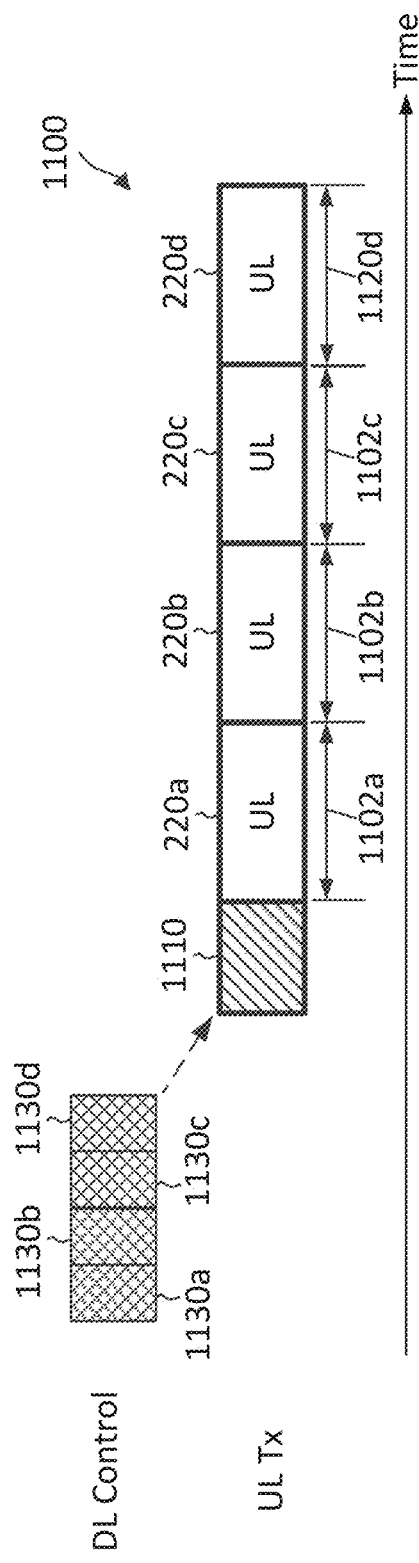
FIG. 11 is a timing diagram illustrating a transmission scenario with continuous allocations and CP extensions according to some embodiments of the present disclosure.

FIG. 11 is a timing diagram illustrating a transmission scenario 1100 with continuous allocations and CP extensions according to some embodiments of the present disclosure. The scenario 1100 may correspond to a scenario in the network 100 where a BS 105 may schedule one or more UEs 115 for continuous UL transmissions. The BS may transmit a UL scheduling grant 1130 for each UL allocation via a DL control channel (e.g., PDCCH). For continuous transmission, the BS may configure no gap between the grants 1130. In other words, the last symbol of a previous grant may be adjacent to a first symbol of a current grant with no transmission gap. In the scenario 1100, the BS transmits a bust of UL scheduling grants 1130 shown as 1130a, 1130b, 1130c, and 1130d. The UL scheduling grant 1130a indicates a UL allocation for transmitting a UL signal 220a in the slot 1102. The UL scheduling grant 1130b indicates a UL allocation for transmitting a UL signal 220b in the slot 1102b. The UL scheduling grant 1130c indicates a UL allocation for transmitting a UL signal 220c in the slot 1102c. The UL scheduling grant 1130d indicates a UL allocation for transmitting a UL signal 220a in the slot 1102d. Each UL scheduling grant 1130 may include a CP extension length indicator (e.g., the CP extension length indicator 910) for a corresponding allocation.

The BS may assign the UL scheduling grants 1130a, 1130b, 1130c, and 1130d to one or more UEs. When a UE detects the continuous allocations or multi-grants 1130 and is assigned with one of the UL scheduling grants 1130, the UE may determine whether to apply a CP extension prior to the transmission based on whether a transmission for a previous grant is detected. For example, a UE assigned with a slot 1102 (e.g., the slot 1102c) may perform signal detection in a previous slot 1102 (e.g., the slot 1102b). When the UE determines that a UL signal 220 is transmitted in the previous slot 1102, the UE may transmit a UL signal in the assigned slot without apply a CP extension since there is no transmission gap. As shown, the UL signals 220a in a beginning slot 1102a of the continuous slots 1102 is transmitted with a CP extension 1110, whereas the UL signals 220b, 220c, and 220d in the subsequent slots 1102 are transmitted without a CP extension.

Figure 12:
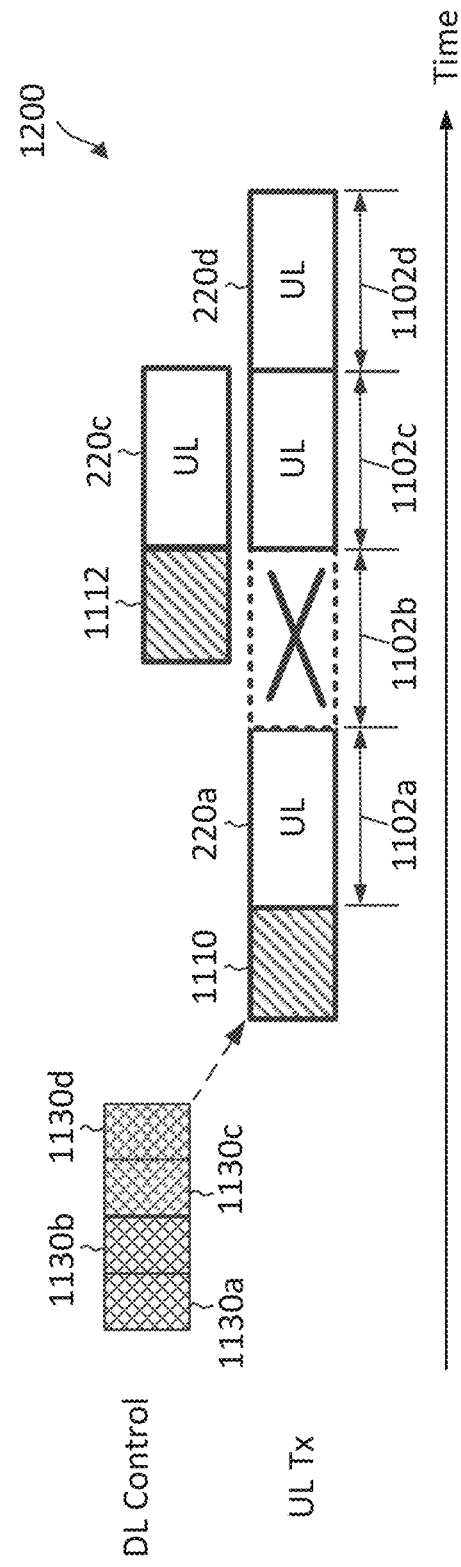
FIG. 12 is a timing diagram illustrating a transmission scenario with continuous allocations and CP extensions according to some embodiments of the present disclosure.

FIG. 12 is a timing diagram illustrating a transmission scenario 1200 with continuous allocations and CP extensions according to some embodiments of the present disclosure. The scenario 1200 may correspond to a scenario in the network 100. The scenario 1200 is described using the same transmission schedule as in the scenario 1100, where a BS transmits a burst of UL scheduling grants 1130a, 1103b, 1130c, and 1130d for continuous UL allocations, and may use the same reference numerals as in FIG. 11 for simplicity's sake. However, in the scenario 1200, not all UL signals 220 are transmitted successfully as scheduled. For example, a UE assigned with the slot 1102b fails to transmit a UL signal 220b in the slot 1102b as shown by the cross. Thus, a UE assigned with the slot 1102c may detect that no signal is transmitted in the previous the slot 1102b and transmits a UL signal 220c in the slot 1102c with a CP extension 1112 according to the CP extension length indicator in the UL scheduling grant 1130c.

In an embodiment, for continuous UL grants, the BS may reduce signaling overhead by excluding a CP extension length indicator from a UL grant there is a previous contiguous UL grant. In other words, the UL scheduling grant 1130a may include a CP extension length indicator, but the UL scheduling grants 1130b, 1130c, and 1130d may not include a CP extension length indicator (e.g., the CP extension length indicator 910).

In an embodiment, for a first UL grant after a DL-to-UL switch and a DL transmission prior to the DL-to-UL switch ends one symbol prior to the UL transmission time, the first UL grant may not include a CP extension length indicator (e.g., the CP extension length indicator 910). In other words, the options 801c and 801d may not be required.

While some signaling overhead related to CP extension length indications can be reduced, the robustness performance can be impacted.

Figure 13:
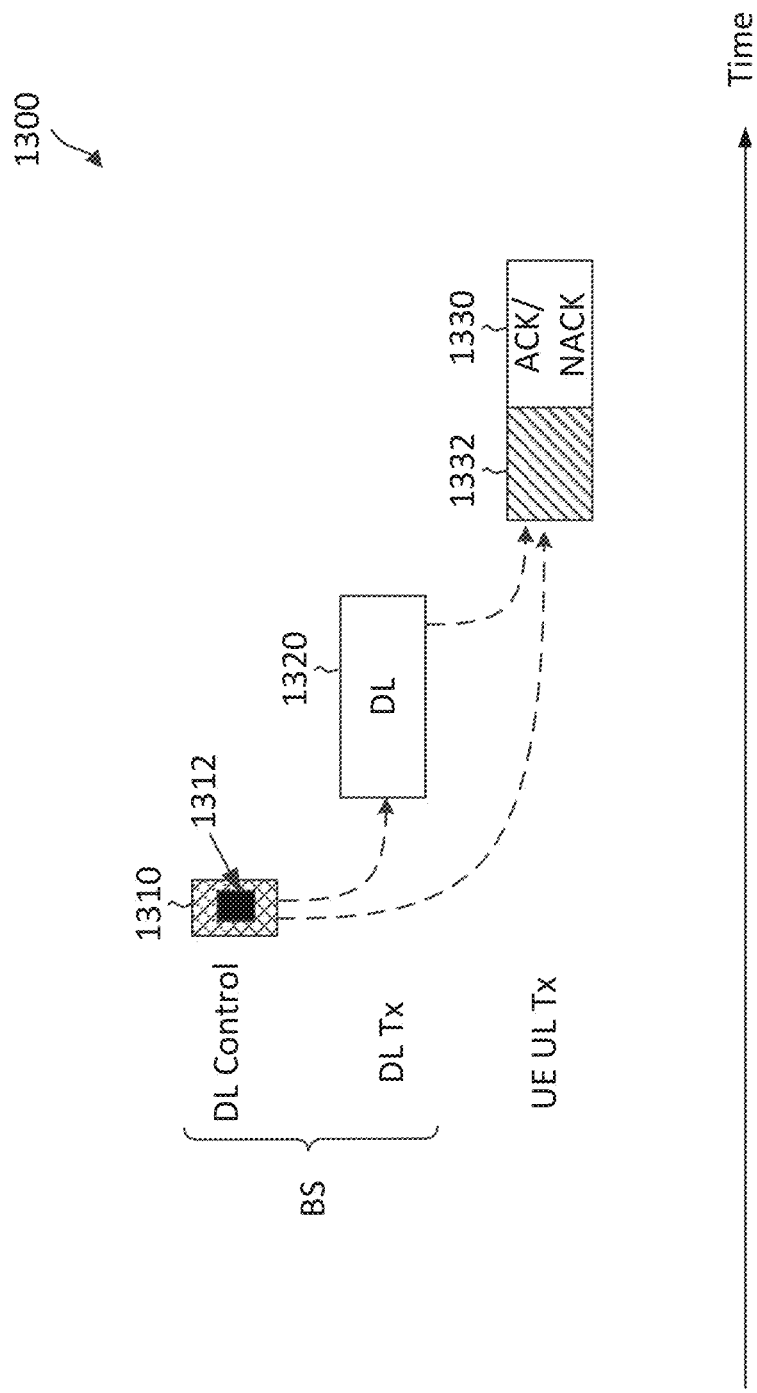
FIG. 13 is a timing diagram illustrating a transmission scheme including feedbacks with CP extensions according to some embodiments of the present disclosure.

FIG. 13 is a timing diagram illustrating a transmission scheme 1300 including feedbacks with CP extensions according to some embodiments of the present disclosure. The scheme 1300 may be employed by a BS such as the BSs 105 and a UE such as the UEs 115 in a network such as the network 100 over a spectrum (e.g., a shared spectrum or an unlicensed spectrum) shared by multiple network operating entities. In FIG. 13, the x-axis represent time in some arbitrary units.

In the scheme 1300, the BS transmits a DL scheduling grant 1310 for a DL transmission. The BS transmits a DL signal 1320 according to the DL scheduling grant 1310. The DL signal 1320 may include DL data (e.g., PDSCH data). The DL scheduling grant 1310 can indicate a feedback schedule 1312 for a UE to transmit an ACK/NACK feedback 1330 to the BS. For example, the UE may transmit an ACK when the DL data is received successfully. Alternatively, the UE may transmit a NACK when the UE fails to receive the DL data successfully (e.g., due to a decode failure). The UE may transmit the ACK/NACK feedback 1330 via a UL control channel (e.g., PUCCH). The BS may include a CP extension length indicator (e.g., the CP extension length indicator 910) in the feedback schedule 1312. The UE may prepend the ACK/NACK feedback 1330 with a CP extension 1332 using similar mechanisms as in the scheme 800.

Figure 14:
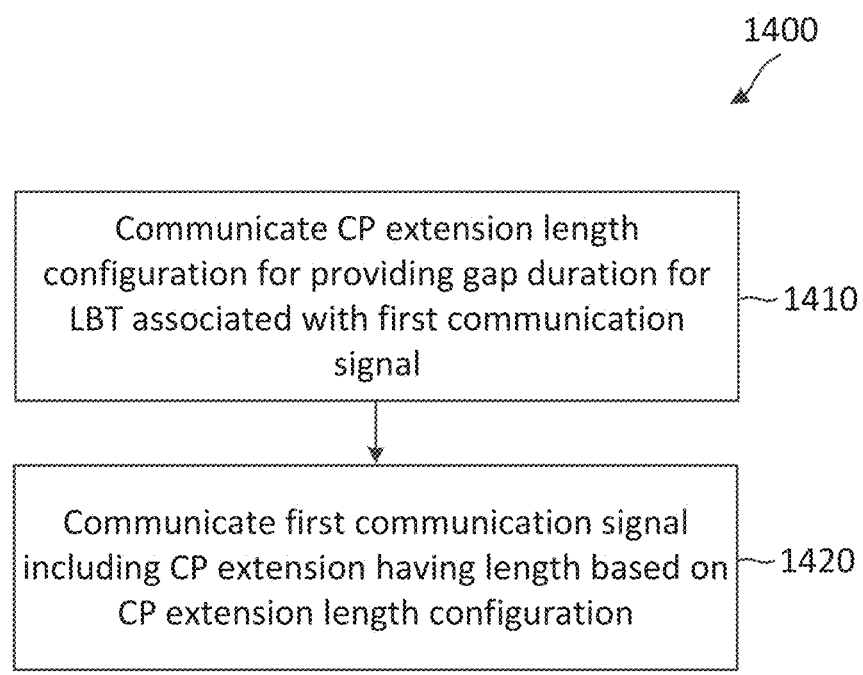
FIG. 14 is a flow diagram of a communication method according to some embodiments of the present disclosure.

FIG. 14 is a flow diagram of a communication method 1400 according to some embodiments of the present disclosure. Steps of the method 1400 can be executed by a computing device (e.g., a processor, processing circuit, and/or other suitable component) of a wireless communication device or other suitable means for performing the steps. For example, a wireless communication device, such as the UE 115 or UE 600, may utilize one or more components, such as the processor 602, the memory 604, the UL configuration and communication module 608, the transceiver 610, the modem 612, and the one or more antennas 616, to execute the steps of method 1400. In another example, a wireless communication device, such as the BS 105 or BS 700, may utilize one or more components, such as the processor 702, the memory 704, the UL configuration and communication module 708, the transceiver 710, the modem 712, and the one or more antennas 716, to execute the steps of method 1400. The method 1400 may employ similar mechanisms as in the schemes 200, 300, 400, 500, 800, 1000, and 1300 described with respect to FIGS. 2, 3, 4, 5, 8, 9, 10, and 13, respectively, and/or the scenarios 1100 and 1200 as described with respect to FIGS. 11 and 12, respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes communicating, by a first wireless communication device with a second wireless communication device, a CP extension length configuration (e.g., the options 801a, 801b, 801c, 801d, the indicators 910, 1014, and 1312) for providing a gap duration (e.g., the gap durations 304, 404, 504, 802) for an LBT associated with a first communication signal.

At step 1420, the method 1400 includes communicating, by the first wireless communication device with the second wireless communication device, the first communication signal including a CP extension (e.g., the CP extensions 310, 410, 510, 810, 1010, 1110, and 1332) having a length (e.g., the durations 306, 407, 804, and 1006) based on the CP extension length configuration.

In an embodiment, the first wireless communication device may be a BS (e.g., the BSs 105 and 700) and the second wireless communication device may be a UE (e.g., the UEs 115 and 600). In such an embodiment, the first wireless communication device may transmit the CP extension length configuration to the second wireless communication device and receive the first communication signal from the second wireless communication device.

In an embodiment, the first wireless communication device may be a UE and the second wireless communication device may be a BS. In such an embodiment, the first wireless communication device may receive the CP extension length configuration from the second wireless communication device and transmit the first communication signal to the second wireless communication device.

In an embodiment, the first wireless communication device communicates the first communication signal by communicating, with the second wireless communication device, a PUSCH in response to an uplink scheduling grant (e.g., the grants 1012 and 1130).

In an embodiment, the first wireless communication device communicates the first communication signal by communicating, with the second wireless communication device, a PUCCH signal in response to a downlink scheduling grant (e.g., the grant 1310) and a DL communication signal (e.g., the DL signal 210) as shown in the scheme 1300.

In an embodiment, the first communication signal includes one or more symbols (e.g., the symbol 201), where a beginning symbol of the one or more symbols is prepended with the CP extension. In an embodiment, the first wireless communication device communicates the first communication signal by communicating, with the second wireless communication device, the one or more symbols in an uplink direction based on a first symbol boundary (e.g., the UL symbol boundary 232). In an embodiment, the CP extension length configuration indicates whether the CP extension is configured to provide the gap duration for no LBT or a category two LBT (e.g., the options 801a, 801b, 801c, and 801d). In an embodiment, the first wireless communication device determines the length for the CP extension based on at least one of a symbol duration or the gap duration (e.g., as shown in equations (4) and (5)). In an embodiment, the first wireless communication device determines whether to perform no LBT or the category two LBT during the gap duration based on the CP extension length configuration. In an embodiment, the first wireless communication device communicates, with a third wireless communication device before the first communication signal, a second communication signal in the uplink direction based on the first symbol boundary, the first communication signal and the second communication signal spaced apart by the gap duration (e.g., a UL-to-UL gap).

In an embodiment, the first wireless communication device communicates, with a third wireless communication device before the first communication signal, a second communication signal in a downlink direction based on a second symbol boundary (e.g., the DL symbol boundary 230) that is offset from the first symbol boundary, the first communication signal and the second communication signal spaced apart by the gap duration (e.g., a DL-to-UL gap). In an embodiment, the CP extension length configuration further indicates whether the gap duration is associated with the offset (e.g., the offset period 208) between the first symbol boundary and the second symbol boundary. In an embodiment, the first wireless communication device determines the length for the CP extension based on at least one of a symbol duration, the gap duration, the offset between the first symbol boundary and the second symbol boundary, or a parameter (e.g., $T_0$ and $T_1$) associated with the LBT for the first communication signal.

In an embodiment, the first wireless communication device communicates the CP extension length configuration by communicating, with the second wireless communication device, a scheduling grant for communicating the first communication signal, the scheduling grant including the CP extension length configuration. In an embodiment, the first wireless communication device communicates the scheduling grant by communicating, with the second wireless communication device, the scheduling grant during a period within a COT (e.g., the COT 1002) of at least one of the first wireless communication device or the second wireless communication device, the scheduling grant (e.g., the scheduling grant 1012) including a schedule for the first communication signal outside of the COT. In an embodiment, CP extension length is further based on a CP extension length mapping for communicating the first communication signal outside of the COT. In an embodiment, the first wireless communication device communicates, with the second wireless communication device, the CP extension length mapping during a period within the COT, for example, in a COT-SI message or a GC-PDCCH message.

In an embodiment, the scheduling grant includes an indicator indicating whether the first communication signal is to be communicated during a first scheduling period or a second scheduling period, and wherein the first scheduling period and the second scheduling period include different durations.

In an embodiment, the first wireless communication device communicates the CP extension length configuration by communicating, with the second wireless communication device, a semi-static configuration (e.g., a RRC configuration) indicating a set of CP extension lengths for communicating the first communication signal.

In an embodiment, the first wireless communication device receives, from the second wireless communication device, a plurality of scheduling grants (e.g., the grants 1130a, 1130b, 1130c, and 1130d) for communications in consecutive periods (e.g., the slots 1102a, 1102b, 1102c, and 1102s), each scheduling grant of the plurality of scheduling grants including a CP extension length configuration. The first wireless communication device determines whether to include a CP extension in a third communication signal based on a signal detection in a first period of the consecutive periods. The first wireless communication device transmits, to the second wireless communication device, the third communication signal during a second period of the consecutive periods, the second period adjacent to the first period.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication. The method of wireless communication includes communicating, by a first wireless communication device with a second wireless communication device, a cyclic prefix (CP) extension length configuration for providing a gap duration for a listen-before-talk (LBT) associated with a first communication signal. The method of wireless communication also includes communicating, by the first wireless communication device with the second wireless communication device, the first communication signal including a CP extension having a length based on the CP extension length configuration.

In some aspects, the method may also include where the communicating the first communication signal includes communicating, by the first wireless communication device with the second wireless communication device, a physical uplink shared channel (PUSCH) signal in response to an uplink scheduling grant. The communicating the first communication signal includes communicating, by the first wireless communication device with the second wireless communication device, a physical uplink control channel (PUCCH) signal in response to a downlink scheduling grant and a downlink communication signal. The first communication signal includes one or more symbols, and where a beginning symbol of the one or more symbols is prepended with the CP extension. The communicating the first communication signal includes communicating, by the first wireless communication device with the second wireless communication device, the one or more symbols in an uplink direction based on a first symbol boundary. The CP extension length configuration indicates whether the CP extension is configured to provide the gap duration for no LBT or a category two LBT. The method may include determining, by the first wireless communication device, the length for the CP extension based on at least one of a symbol duration or the gap duration. The method may include determining, by the first wireless communication device, whether to perform no LBT or the category two LBT during the gap duration based on the CP extension length configuration. The method may include communicating, by the first wireless communication device with a third wireless communication device before the first communication signal, a second communication signal in the uplink direction based on the first symbol boundary, the first communication signal and the second communication signal spaced apart by the gap duration. The method may include communicating, by the first wireless communication device with a third wireless communication device before the first communication signal, a second communication signal in a downlink direction based on a second symbol boundary that is offset from the first symbol boundary, the first communication signal and the second communication signal spaced apart by the gap duration. The CP extension length configuration further indicates whether the gap duration is associated with the offset between the first symbol boundary and the second symbol boundary. The method may include determining, by the first wireless communication device, the length for the CP extension based on at least one of a symbol duration, the gap duration, the offset between the first symbol boundary and the second symbol boundary, or a parameter associated with the LBT for the first communication signal. The communicating the CP extension length configuration includes communicating, by the first wireless communication device with the second wireless communication device, a scheduling grant for communicating the first communication signal, the scheduling grant including the CP extension length configuration. The communicating the scheduling grant includes communicating, by the first wireless communication device with the second wireless communication device, the scheduling grant during a period within a channel occupancy time (COT) of at least one of the first wireless communication device or the second wireless communication device, the scheduling grant including a schedule for the first communication signal outside of the COT. The CP extension length is further based on a CP extension length mapping for communicating the first communication signal outside of the COT. The method may include communicating, by the first wireless communication device with the second wireless communication device, the CP extension length mapping during a period within the COT. The scheduling grant includes an indicator indicating whether the first communication signal is to be communicated during a first scheduling period or a second scheduling period, and where the first scheduling period and the second scheduling period include different durations. The communicating the CP extension length configuration includes communicating, by the first wireless communication device with the second wireless communication device, a semi-static configuration indicating a set of CP extension lengths for communicating the first communication signal. The method may include receiving, by the first wireless communication device from the second wireless communication device, a plurality of scheduling grants for communications in consecutive periods, each scheduling grant of the plurality of scheduling grants including a CP extension length configuration; determining, by the first wireless communication device, whether to include a CP extension in a third communication signal based on a signal detection in a first period of the consecutive periods; and transmitting, by the first wireless communication device to the second wireless communication device, the third communication signal during a second period of the consecutive periods, the second period adjacent to the first period.

Further embodiments of the present disclosure include an apparatus including a transceiver configured to communicate, with a first wireless communication device, a cyclic prefix (CP) extension length configuration for providing a gap duration for a listen-before-talk (LBT) associated with a first communication signal; and communicate, with the first wireless communication device, the first communication signal including a CP extension having a length based on the CP extension length configuration.

In some aspects, the apparatus may include where the transceiver configured to communicate the first communication signal is further configured to communicate, with the first wireless communication device, a physical uplink shared channel (PUSCH) signal in response to an uplink scheduling grant. The transceiver configured to communicate the first communication signal is further configured to communicate, with the first wireless communication device, a physical uplink control channel (PUCCH) signal in response to a downlink scheduling grant and a downlink communication signal. The first communication signal includes one or more symbols, and where a beginning symbol of the one or more symbols is prepended with the CP extension. The transceiver configured to communicate the first communication signal is further configured to communicate, with the first wireless communication device, the one or more symbols in an uplink direction based on a first symbol boundary. The CP extension length configuration indicates whether the CP extension is configured to provide the gap duration for no LBT or a category two LBT. The apparatus may include a processor configured to determine the length for the CP extension based on at least one of a symbol duration or the gap duration. The apparatus may include a processor configured to determine whether to perform no LBT or the category two LBT during the gap duration based on the CP extension length configuration. The transceiver is further configured to communicate, with a second wireless communication device before the first communication signal, a second communication signal in the uplink direction based on the first symbol boundary, the first communication signal and the second communication signal spaced apart by the gap duration. The transceiver is further configured to communicate, with a second wireless communication device before the first communication signal, a second communication signal in a downlink direction based on a second symbol boundary that is offset from the first symbol boundary, the first communication signal and the second communication signal spaced apart by the gap duration. The CP extension length configuration further indicates whether the gap duration is associated with the offset between the first symbol boundary and the second symbol boundary. The apparatus may include a processor configured to determine the length for the CP extension based on at least one of a symbol duration, the gap duration, the offset between the first symbol boundary and the second symbol boundary, or a parameter associated with the LBT for the first communication signal. The transceiver configured to communicate the CP extension length configuration is further configured to communicate, with the first wireless communication device, a scheduling grant for communicating the first communication signal, the scheduling grant including the CP extension length configuration. The transceiver configured to communicate the scheduling grant is further configured to communicate, with the first wireless communication device, the scheduling grant during a period within a channel occupancy time (COT) of at least one of the apparatus or the first wireless communication device, the scheduling grant including a schedule for the first communication signal outside of the COT. The CP extension length is further based on a CP extension length mapping for communicating the first communication signal outside of the COT. The transceiver is further configured to communicate, with the first wireless communication device, the CP extension length mapping during a period within the COT. The scheduling grant includes an indicator indicating whether the first communication signal is to be communicated during a first scheduling period or a second scheduling period, and where the first scheduling period and the second scheduling period include different durations. The transceiver configured to communicate the CP extension length configuration is further configured to communicate, with the first wireless communication device, a semi-static configuration indicating a set of CP extension lengths for communicating the first communication signal. Colon>the transceiver is further configured to receive, from the first wireless communication device, a plurality of scheduling grants for communications in consecutive periods, each scheduling grant of the plurality of scheduling grants including a CP extension length configuration; and transmit, to the first wireless communication device, a third communication signal during a first period of the consecutive periods, and the apparatus further includes a processor configured to determine whether to include a CP extension in the third communication signal based on a signal detection in a second period of the consecutive periods, the second period adjacent to the first period.

Further embodiments of the present disclosure include a non-transitory computer-readable medium having program code recorded thereon. The non-transitory computer-readable medium also includes code for causing a first wireless communication device to communicate, with a second wireless communication device, a cyclic prefix (CP) extension length configuration for providing a gap duration for a listen-before-talk (LBT) associated with a first communication signal. The non-transitory computer-readable medium also includes code for causing the first wireless communication device to communicate, with the second wireless communication device, the first communication signal including a CP extension having a length based on the CP extension length configuration.

In some aspects, the non-transitory computer-readable medium may also include where the code for causing the first wireless communication device to communicate the first communication signal is further configured to communicate, with the second wireless communication device, a physical uplink shared channel (PUSCH) signal in response to an uplink scheduling grant. The code for causing the first wireless communication device to communicate the first communication signal is further configured to communicate, with the second wireless communication device, a physical uplink control channel (PUCCH) signal in response to a downlink scheduling grant and a downlink communication signal. The first communication signal includes one or more symbols, and where a beginning symbol of the one or more symbols is prepended with the CP extension. The code for causing the first wireless communication device to communicate the first communication signal is further configured to communicate, with the second wireless communication device, the one or more symbols in an uplink direction based on a first symbol boundary. The CP extension length configuration indicates whether the CP extension is configured to provide the gap duration for no LBT or a category two LBT. The non-transitory computer-readable medium may include code for causing the first wireless communication device to determine the length for the CP extension based on at least one of a symbol duration or the gap duration. The non-transitory computer-readable medium may include code for causing the first wireless communication device to determine whether to perform no LBT or the category two LBT during the gap duration based on the CP extension length configuration. The non-transitory computer-readable medium may include code for causing the first wireless communication device to communicate, with a third wireless communication device before the first communication signal, a second communication signal in the uplink direction based on the first symbol boundary, the first communication signal and the second communication signal spaced apart by the gap duration. The non-transitory computer-readable medium may include code for causing the first wireless communication device to communicate, with a third wireless communication device before the first communication signal, a second communication signal in a downlink direction based on a second symbol boundary that is offset from the first symbol boundary, the first communication signal and the second communication signal spaced apart by the gap duration. The CP extension length configuration further indicates whether the gap duration is associated with the offset between the first symbol boundary and the second symbol boundary. The non-transitory computer-readable medium may include code for causing the first wireless communication device to determine the length for the CP extension based on at least one of a symbol duration, the gap duration, the offset between the first symbol boundary and the second symbol boundary, or a parameter associated with the LBT for the first communication signal. The code for causing the first wireless communication device to communicate the CP extension length configuration is further configured to communicate, with the second wireless communication device, a scheduling grant for communicating the first communication signal, the scheduling grant including the CP extension length configuration. The code for causing the first wireless communication device to communicate the scheduling grant is further configured to communicate, with the second wireless communication device, the scheduling grant during a period within a channel occupancy time (COT) of at least one of the first wireless communication device or the second wireless communication device, the scheduling grant including a schedule for the first communication signal outside of the COT. The CP extension length is further based on a CP extension length mapping for communicating the first communication signal outside of the COT. The non-transitory computer-readable medium may include code for causing the first wireless communication device to communicate, with the second wireless communication device, the CP extension length mapping during a period within the COT. The scheduling grant includes an indicator indicating whether the first communication signal is to be communicated during a first scheduling period or a second scheduling period, and where the first scheduling period and the second scheduling period include different durations. The code for causing the first wireless communication device to communicate the CP extension length configuration is further configured to communicate, with the second wireless communication device, a semi-static configuration indicating a set of CP extension lengths for communicating the first communication signal. The non-transitory computer-readable medium may include code for causing the first wireless communication device to receive, from the second wireless communication device, a plurality of scheduling grants for communications in consecutive periods, each scheduling grant of the plurality of scheduling grants including a CP extension length configuration; code for causing the first wireless communication device to determine whether to include a CP extension in a third communication signal based on a signal detection in a first period of the consecutive periods; and code for causing the first wireless communication device to transmit, to the second wireless communication device, the third communication signal during a second period of the consecutive periods, the second period adjacent to the first period.

Further embodiments of the present disclosure include an apparatus including means for communicating, with a second wireless communication device, a cyclic prefix (CP) extension length configuration for providing a gap duration for a listen-before-talk (LBT) associated with a first communication signal. The apparatus also includes means for communicating, with the second wireless communication device, the first communication signal including a CP extension having a length based on the CP extension length configuration.

In some aspects, the apparatus may also include where the means for communicating the first communication signal is further configured to communicate, with the second wireless communication device, a physical uplink shared channel (PUSCH) signal in response to an uplink scheduling grant. The means for communicating the first communication signal is further configured to communicate, with the second wireless communication device, a physical uplink control channel (PUCCH) signal in response to a downlink scheduling grant and a downlink communication signal. The first communication signal includes one or more symbols, and where a beginning symbol of the one or more symbols is prepended with the CP extension. The means for communicating the first communication signal is further configured to communicate, with the second wireless communication device, the one or more symbols in an uplink direction based on a first symbol boundary. The CP extension length configuration indicates whether the CP extension is configured to provide the gap duration for no LBT or a category two LBT. The apparatus may include means for determining the length for the CP extension based on at least one of a symbol duration or the gap duration. The apparatus may include means for determining whether to perform no LBT or the category two LBT during the gap duration based on the CP extension length configuration. The apparatus may include means for communicating, with a third wireless communication device before the first communication signal, a second communication signal in the uplink direction based on the first symbol boundary, the first communication signal and the second communication signal spaced apart by the gap duration. The apparatus may include means for communicating, with a third wireless communication device before the first communication signal, a second communication signal in a downlink direction based on a second symbol boundary that is offset from the first symbol boundary, the first communication signal and the second communication signal spaced apart by the gap duration. The CP extension length configuration further indicates whether the gap duration is associated with the offset between the first symbol boundary and the second symbol boundary. The apparatus may include means for determining the length for the CP extension based on at least one of a symbol duration, the gap duration, the offset between the first symbol boundary and the second symbol boundary, or a parameter associated with the LBT for the first communication signal. The means for communicating the CP extension length configuration is further configured to communicate, with the second wireless communication device, a scheduling grant for communicating the first communication signal, the scheduling grant including the CP extension length configuration. The means for communicating the scheduling grant is further configured to communicate, with the second wireless communication device, the scheduling grant during a period within a channel occupancy time (COT) of at least one of the first wireless communication device or the second wireless communication device, the scheduling grant including a schedule for the first communication signal outside of the COT. The CP extension length is further based on a CP extension length mapping for communicating the first communication signal outside of the COT. The apparatus may include means for communicating, with the second wireless communication device, the CP extension length mapping during a period within the COT. The scheduling grant includes an indicator indicating whether the first communication signal is to be communicated during a first scheduling period or a second scheduling period, and where the first scheduling period and the second scheduling period include different durations. The means for communicating the CP extension length configuration is further configured to communicate, with the second wireless communication device, a semi-static configuration indicating a set of CP extension lengths for communicating the first communication signal. The apparatus may include means for receiving, from the second wireless communication device, a plurality of scheduling grants for communications in consecutive periods, each scheduling grant of the plurality of scheduling grants including a CP extension length configuration; means for determining whether to include a CP extension in a third communication signal based on a signal detection in a first period of the consecutive periods; and means for transmitting, to the second wireless communication device, the third communication signal during a second period of the consecutive periods, the second period adjacent to the first period.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   receiving, by a user equipment (UE) from a base station (BS), a downlink control information (DCI) message scheduling a first communication signal, the DCI message including a cyclic prefix (CP) extension length configuration associated with a gap duration for a listen-before-talk (LBT) to be used for transmitting the scheduled first communication signal; and
   transmitting, by the UE to the BS, the first communication signal including a CP extension having a length based on the CP extension length configuration.

2. The method of claim 1, wherein the first communication signal includes one or more symbols, and wherein a beginning symbol of the one or more symbols is prepended with the CP extension.

3. The method of claim 2, wherein the transmitting the first communication signal includes:
   transmitting, by the UE to the BS, the one or more symbols in an uplink direction based on a first symbol boundary.

4. The method of claim 1, wherein the CP extension length configuration further indicates that the length of the CP extension corresponds to a symbol duration subtracted by the gap duration of 25 microseconds (µs).

5. The method of claim 4, wherein the first communication signal is spaced apart from a second communication signal by the gap duration.

6. The method of claim 1, wherein the CP extension length configuration further indicates that the length of the CP extension corresponds to a symbol duration subtracted by the gap duration and a timing advance, and wherein the gap duration is 16 microseconds (µs) or 25 µs.

7. The method of claim 6, further comprising:
   receiving, by the UE from the BS before the first communication signal, a second communication signal in a downlink direction, the first communication signal and the second communication signal being spaced apart by the gap duration.

8. The method of claim 1, wherein the CP extension length configuration indicates whether the CP extension is configured to provide the gap duration for no LBT or a category two LBT.

9. The method of claim 1, wherein the length for the CP extension is based on at least one of a symbol duration or the gap duration.

10. The method of claim 1, wherein the CP extension length configuration indicates the length of the CP extension corresponds to at least one of:
    a symbol duration subtracted by a 25 microseconds (µs) gap duration;
    the symbol duration subtracted by the 25 microseconds (µs) gap duration and a timing advance; or
    the symbol duration subtracted by a 16 µs gap duration and the timing advance.

11. The method of claim 1, wherein the transmitting the first communication signal includes:
    transmitting, by the UE to the BS, a physical uplink shared channel (PUSCH) signal in response to the DCI message.

12. The method of claim 1, wherein the transmitting the first communication signal includes:
    transmitting, by the UE to the BS, a physical uplink control channel (PUCCH) signal in response to the DCI message and a downlink communication signal associated with the DCI message.

13. The method of claim 1, further comprising:
    receiving, by the UE from the BS, a plurality of scheduling grants for communications in consecutive periods, each scheduling grant of the plurality of scheduling grants including a CP extension length configuration;

determining, by the UE, whether to include a CP extension in a third communication signal based on a signal detection in a first period of the consecutive periods; and transmitting, by the UE to the BS, the third communication signal during a second period of the consecutive periods, the second period adjacent to the first period.

14. An apparatus comprising:
a transceiver configured to:
receive, from a base station (BS), a downlink control information (DCI) message scheduling a first communication signal, the DCI message including a cyclic prefix (CP) extension length configuration associated with a gap duration for a listen-before-talk (LBT) to be used for transmitting the scheduled first communication signal; and
transmit, to the BS, the first communication signal including a CP extension having a length based on the CP extension length configuration.

15. The apparatus of claim 14, wherein the transceiver configured to communicate the first communication signal is further configured to:
transmit, to the BS, the first communication signal including one or more symbols in an uplink direction based on a first symbol boundary, wherein a beginning symbol of the one or more symbols is prepended with the CP extension.

16. The apparatus of claim 14, wherein the CP extension length configuration further indicates that the length of the CP extension corresponds to a symbol duration subtracted by the gap duration of 25 microseconds (µs), and wherein the first communication signal is spaced apart from a second communication signal by the gap duration.

17. The apparatus of claim 14, wherein the CP extension length configuration further indicates that the length of the CP extension corresponds to a symbol duration subtracted by the gap duration and a timing advance, wherein the gap duration is 16 microseconds (µs) or 25 µs, and wherein the transceiver is further configured to:
receive, from the BS before the first communication signal, a second communication signal in a downlink direction, the first communication signal and the second communication signal spaced apart by the gap duration.

18. The apparatus of claim 14, wherein the CP extension length configuration indicates whether the CP extension is configured to provide the gap duration for no LBT or a category two LBT.

19. The apparatus of claim 14, wherein the length for the CP extension is based on at least one of a symbol duration or the gap duration.

20. The apparatus of claim 14, wherein the CP extension length configuration further indicates that the length of the CP extension corresponds to at least one of:
a symbol duration subtracted by a 25 microseconds (µs) gap duration;
the symbol duration subtracted by the 25 microseconds (µs) gap duration and a timing advance; or
the symbol duration subtracted by a 16 µs gap duration and the timing advance.

21. The apparatus of claim 14, wherein:
the transceiver is further configured to:
receive, from the BS, a plurality of scheduling grants for communications in consecutive periods, each scheduling grant of the plurality of scheduling grants including a CP extension length configuration; and transmit, to the BS, a third communication signal during a first period of the consecutive periods, and
the apparatus further comprises:
a processor configured to determine whether to include a CP extension in the third communication signal based on a signal detection in a second period of the consecutive periods, the second period adjacent to the first period.

22. A non-transitory computer-readable medium having program code recorded thereon, the program code comprising:
code for causing a user equipment (UE) to receive, from a base station (BS), a downlink control information (DCI) message scheduling a first communication signal, the DCI message including a cyclic prefix (CP) extension length configuration associated with a gap duration for a listen-before-talk (LBT) to be used for transmitting the scheduled first communication signal; and
code for causing the UE to transmit, to the BS, the first communication signal including a CP extension having a length based on the CP extension length configuration.

23. The non-transitory computer-readable medium of claim 22, wherein the CP extension length configuration further indicates that the length of the CP extension corresponds to a symbol duration subtracted by the gap duration of 25 microseconds (µs), and wherein the first communication signal is spaced apart from a second communication signal by the gap duration.

24. The non-transitory computer-readable medium of claim 22, wherein the CP extension length configuration further indicates that the length of the CP extension corresponds to a symbol duration subtracted by the gap duration and a timing advance, wherein the gap duration is 16 microseconds (µs) or 25 µs, and wherein the program code further comprises:
code for causing the UE to receive, from the BS before the first communication signal, a second communication signal in a downlink direction, the first communication signal and the second communication signal spaced apart by the gap duration.

25. The non-transitory computer-readable medium of claim 22, wherein the CP extension length configuration further indicates that the length of the CP extension corresponds to at least one of:
a symbol duration subtracted by a 25 microseconds (µs) gap duration;
the symbol duration subtracted by the 25 microseconds (µs) gap duration and a timing advance; or
the symbol duration subtracted by a 16 µs gap duration and the timing advance.

26. The non-transitory computer-readable medium of claim 22, further comprising:
code for causing the UE to receive, from the BS, a plurality of scheduling grants for communications in consecutive periods, each scheduling grant of the plurality of scheduling grants including a CP extension length configuration;
code for causing the UE to determine whether to include a CP extension in a third communication signal based on a signal detection in a first period of the consecutive periods; and
code for causing the UE to transmit, to the BS, the third communication signal during a second period of the consecutive periods, the second period adjacent to the first period.

* * * * *